(12) United States Patent
Rudmann et al.

(10) Patent No.: US 10,377,094 B2
(45) Date of Patent: Aug. 13, 2019

(54) MANUFACTURE OF TRUNCATED LENSES, OF PAIRS OF TRUNCATED LENSES AND OF CORRESPONDING DEVICES

(71) Applicant: ams Sensors Singapore Pte. Ltd., Singapore (SG)

(72) Inventors: Hartmut Rudmann, Jona (CH); Jürgen Soechtig, Wettswil (CH); Nicola Spring, Ziegelbrücke (CH); Alexander Bietesch, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 381 days.

(21) Appl. No.: 14/426,472

(22) PCT Filed: Sep. 3, 2013

(86) PCT No.: PCT/SG2013/000384
§ 371 (c)(1),
(2) Date: Mar. 6, 2015

(87) PCT Pub. No.: WO2014/042591
PCT Pub. Date: Mar. 20, 2014

(65) Prior Publication Data
US 2015/0217524 A1    Aug. 6, 2015

Related U.S. Application Data

(60) Provisional application No. 61/699,666, filed on Sep. 11, 2012.

(51) Int. Cl.
*B29D 11/00* (2006.01)
*G02B 3/00* (2006.01)
(Continued)

(52) U.S. Cl.
CPC .......... *B29D 11/00* (2013.01); *B29C 33/3842* (2013.01); *B29D 11/00365* (2013.01);
(Continued)

(58) Field of Classification Search
CPC .. B29D 11/00; B29D 11/00365; B21D 22/14; B21D 22/16; B21D 22/18; B21D 37/16;
(Continued)

(56) References Cited

U.S. PATENT DOCUMENTS 3,270,383 A * 9/1966 Hall .................. B22D 17/10
                                              164/120
4,407,766 A * 10/1983 Haardt ............. B29D 11/00019
                                              249/117
(Continued)

FOREIGN PATENT DOCUMENTS

CN          1745319 A    3/2008
CN        101147392 A    3/2008
(Continued)

OTHER PUBLICATIONS

Supplementary European Search Report issued in EP Application No. 13837476.4, dated May 17, 2016 (9 pages).
(Continued)

*Primary Examiner* — William P Bell
*Assistant Examiner* — Andrew L Swanson
(74) *Attorney, Agent, or Firm* — Fish & Richardson P.C.

(57) ABSTRACT

The invention relates to wafer-level manufacturing of optical devices such as modules comprising micro-lenses. In one aspect, passive optical components such as truncated lenses are manufactured by providing a substrate on which a multitude of precursor optical structures is present; and removing material from each of said multitude of precursor optical structures. Another aspect comprises a method for manufacturing a device comprising a set of at least two
(Continued)

passive optical components, said method comprising the steps of using a tool obtained by carrying out the steps of manufacturing a precursor tool having a replication surface; and modifying said replication surface by removing material from said precursor tool. An yet another aspect comprises a method for manufacturing a device comprising a set of at least two passive optical components, wherein the method comprises the step of using a master comprising a replication surface comprising, for each of said passive optical components, a first portion describing a shape corresponding to the shape of at least a portion of the respective passive optical component, wherein the master comprises, in addition, at least one protruding portion protruding from at least one of said first portions of said replication surfaces.

24 Claims, 7 Drawing Sheets

(51) Int. Cl.
    *B29C 33/38*           (2006.01)
    *G02B 13/00*          (2006.01)
    *B29C 33/00*          (2006.01)
    *B29L 11/00*           (2006.01)

(52) U.S. Cl.
    CPC ......... *G02B 3/0031* (2013.01); *G02B 3/0062* (2013.01); *G02B 13/0085* (2013.01); *B29C 33/0022* (2013.01); *B29K 2995/0094* (2013.01); *B29L 2011/0016* (2013.01)

(58) Field of Classification Search
    CPC ............ B29C 35/0888; B29C 33/3842; B29C 33/0022; G02B 3/0031; G02B 3/0062; G02B 13/0085; B29K 2995/0094; B29L 2011/0016
    See application file for complete search history.

(56) References Cited

U.S. PATENT DOCUMENTS

| | | | |
|---|---|---|---|
| 5,536,455 A | | 7/1996 | Aoyama et al. |
| 5,759,457 A | * | 6/1998 | Inoue ...................... B29C 33/42 216/24 |
| 2003/0113077 A1 | * | 6/2003 | Xu ....................... G02B 6/4204 385/93 |
| 2005/0180690 A1 | | 8/2005 | Sugiyama et al. |
| 2005/0272833 A1 | | 12/2005 | Doshi |
| 2006/0170810 A1 | | 8/2006 | Kim |
| 2006/0259546 A1 | | 11/2006 | Rudmann et al. |
| 2007/0216048 A1 | * | 9/2007 | Rudmann ............. B29C 43/021 264/1.7 |
| 2009/0122175 A1 | | 5/2009 | Yamagata |
| 2009/0323195 A1 | | 12/2009 | Hembree et al. |
| 2010/0072640 A1 | | 3/2010 | Rudmann et al. |
| 2010/0173113 A1 | * | 7/2010 | Ermochkine ......... B29C 43/003 428/58 |
| 2010/0270692 A1 | * | 10/2010 | Yu ........................ B29C 43/021 264/1.38 |
| 2011/0063487 A1 | | 3/2011 | Yamada et al. |
| 2012/0182624 A1 | | 7/2012 | Itou et al. |

FOREIGN PATENT DOCUMENTS

| | | | | |
|---|---|---|---|---|
| CN | 102023326 A | | 4/2011 | |
| CN | 102576139 A | | 7/2012 | |
| JP | 58-171021 | | 10/1983 | |
| JP | 58171021 A | * | 10/1983 | ....... B29D 11/00278 |
| JP | 2009209012 A | | 9/2009 | |
| JP | 2011-249445 A | | 12/2011 | |
| TW | 200838678 | | 4/2008 | |
| WO | 2004/068198 | | 8/2004 | |
| WO | 2007/140643 | | 12/2007 | |
| WO | 2009/023465 | | 2/2009 | |
| WO | WO 2009/153907 | | 12/2009 | |

OTHER PUBLICATIONS

Australian Patent Office International Search Report for PCT/SG2013/000384 dated Jan. 20, 2014.
Japanese, Patent Office, Office Action issued in Japanese Application No. 2015-531046, dated May 16, 2018, 4 pages (English Translation).
China National Intellectual Property Administration, Office Action issued in CN Application No. 201710789221.5, dated Oct. 31, 2018, 13 pages (with English Translation).
China National Intellectual Property Administration, Office Action issued in CN Application No. 201710789204.1, dated Nov. 2, 2018, 24 pages (with English translation).
Taiwanese Patent Office, Search Report issued in Taiwan Application No. 102131991, 1 page (dated Mar. 9, 2017).
China National Intellectual Property Administration, Office Action for Chinese Application No. 201710789204.1, dated May 24, 2019, 23 pages (with English translation).

* cited by examiner

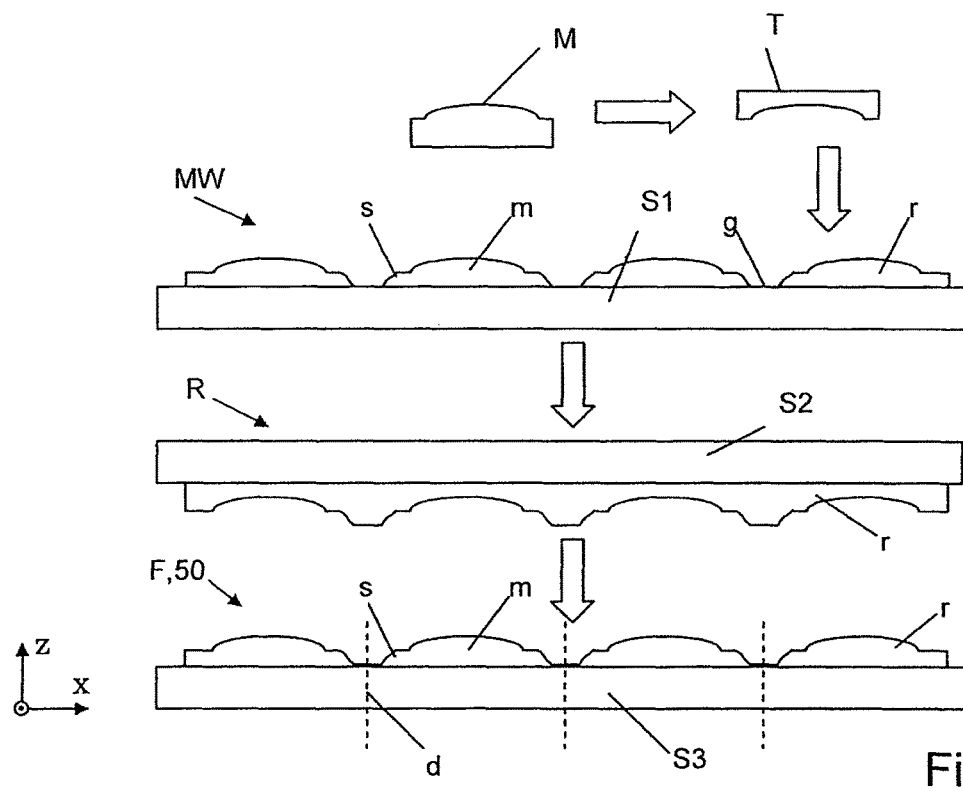
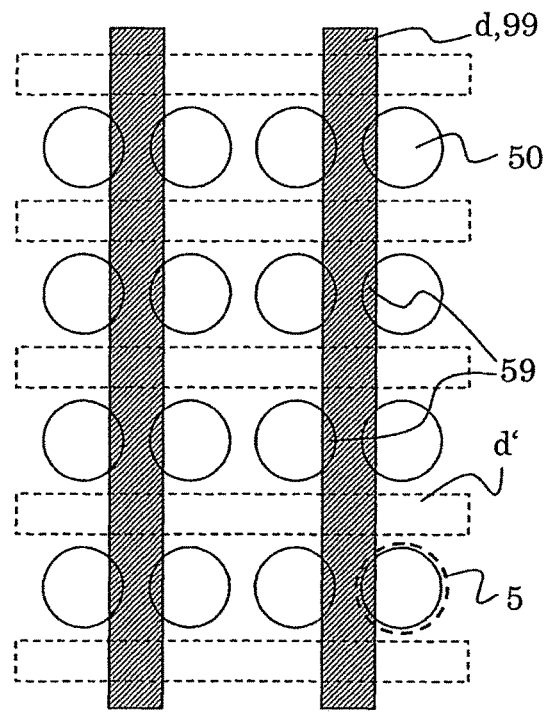
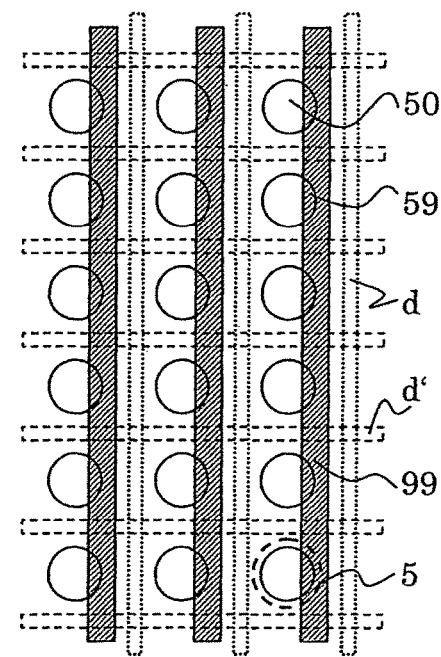
Fig. 1
Fig. 2
Fig. 3

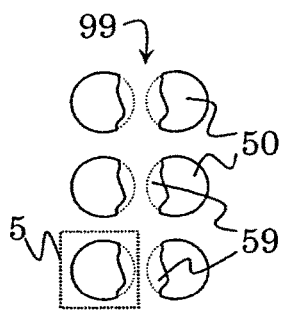
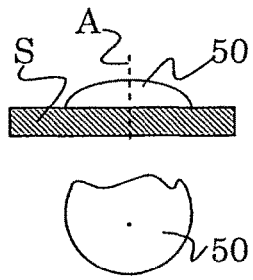
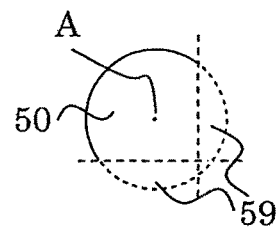
Fig. 4        Fig. 5        Fig. 6
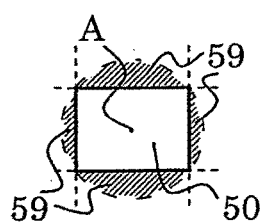
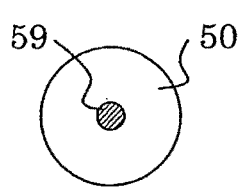
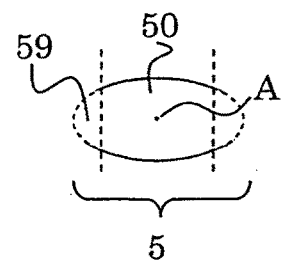
Fig. 7        Fig. 9        Fig. 8
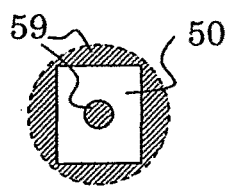
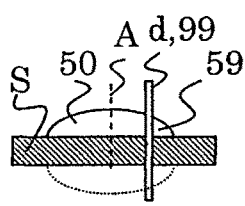
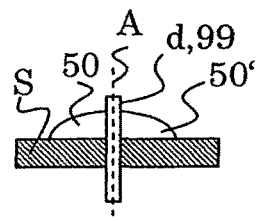
Fig. 10        Fig. 11        Fig. 12
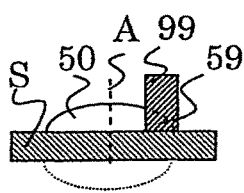
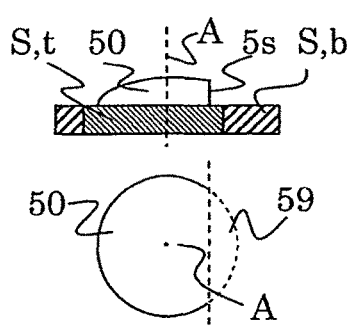
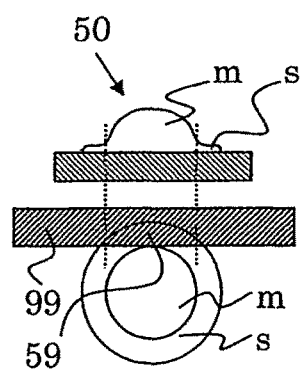
Fig. 13        Fig. 14        Fig. 17

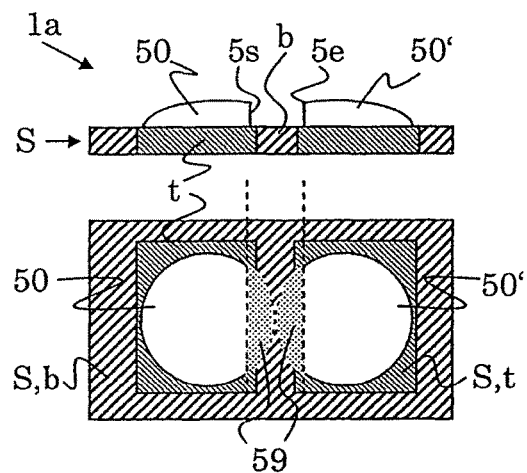
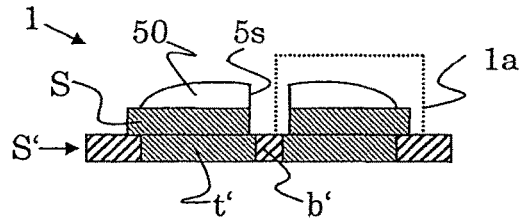
Fig. 15
Fig. 16
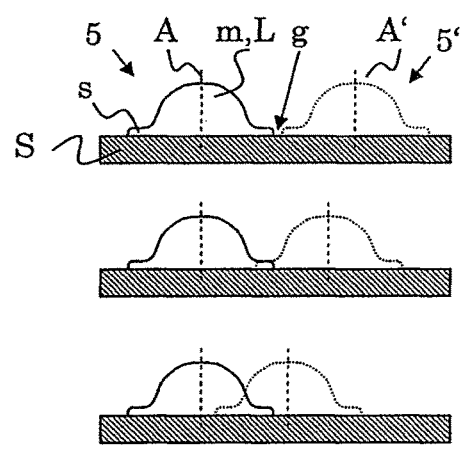
Fig. 18
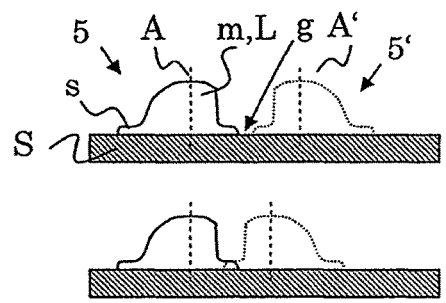
Fig. 19

MANUFACTURE OF TRUNCATED LENSES, OF PAIRS OF TRUNCATED LENSES AND OF CORRESPONDING DEVICES

TECHNICAL FIELD

The invention relates to the field of optics, and in particular to micro optics and partially also micro-optoelectronics. More particularly, it relates to devices and more specifically optical devices or optical modules such as, e.g., usable in sensors, in cameras, and more specifically in multi-channel or computational cameras. The invention relates to methods and apparatuses according to the opening clauses of the claims.

DEFINITION OF TERMS

"Active optical component": A light sensing or a light emitting component. E.g., a photodiode, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, a mirror, or an optical system, wherein an optical system is a collection of such optical components possibly also comprising mechanical elements such as aperture stops, image screens, holders. The term "passive" in "passive optical component" does not exclude the possibility to have electrically operated or actuated parts therein.

"Opto-electronic module": A component in which at least one active and at least one passive optical component is comprised.

"Replication": A technique by means of which a given structure or a negative thereof is reproduced. E.g., etching, embossing, imprinting, casting, molding.

"Wafer": A substantially disk- or plate-like shaped item, its extension in one direction (z-direction or vertical direction) is small with respect to its extension in the other two directions (x- and y-directions or lateral directions). Usually, on a (non-blank) wafer, a plurality of like structures or items are arranged or provided therein, typically on a rectangular grid. A wafer may have openings or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material comprising metals and polymers or polymers and glass materials. In particular, hardenable materials such as thermally or UV-curable polymers are interesting wafer materials in conjunction with the presented invention, but semiconductor materials, too.

"Lateral": cf. "Wafer"

"Vertical": cf. "Wafer"

"Light": Most generally electromagnetic radiation; more particularly electromagnetic radiation of the infrared, visible or ultraviolet portion of the electromagnetic spectrum.

BACKGROUND OF THE INVENTION

From WO 2004/068198, ways of manufacturing optical elements by replication are known.

From WO 2007/140643, it is know to use recombination in replication of optical elements.

US 2006/0170810 A1 discloses methods for forming lens patterns by forming lenses on pre-formed lenses.

From U.S. Pat. No. 5,536,455, it is known to manufacture lenses placed in the middle of pre-formed lenses.

WO 2009/023465 A2 discloses a way of placing lenses off-center on a semiconductor device, so as to have an optical axis of the lens coinciding with an optically active region which is placed off-center in the semiconductor device. It is suggested to manufacture such lenses using molding.

SUMMARY OF THE INVENTION

The inventors have recognized that, for specific applications, it can be valuable to have passive optical components, such as lenses, or —more generally—optical structures, which have a peculiar shape such as unusual edges, e.g., a generally spherical plane-concave or plane-convex lens having a rectangular lens aperture or a lens aperture describing a circle from which a portion has been taken away.

Analogously to the term "lens aperture," a more general "aperture of a passive optical component" and "aperture of an optical structure" shall be defined. More specifically, an aperture of a passive optical component or, more generally, an aperture of an optical structure can be defined to denote the optically relevant area of the respective passive optical component or optical structure. Said relevant area is an area in a plane perpendicular to an optical axis, wherein the optical axis usually is the optical axis of the passive optical component and optical structure, respectively. Considering that the present invention is, at least to some extent, based on wafer-level manufacturing, said plane can in particular be in many cases the lateral plane (as defined by a corresponding wafer), which certainly coincides with the (corresponding) plane defined by a wafer portion or substrate (or substrate member) on which the passive optical component or optical structure is present after separation of the wafer into a multitude of devices. More particularly, the aperture of a transparent passive optical component or optical structure can, at least in a specific view, be defined as the area through which light can pass through the passive optical component or optical structure onto the wafer and said wafer portion, respectively. For reflective passive optical components or optical structures, the aperture may be defined as that laterally defined area through which vertically directed light impinges on the passive optical component or optical structure.

Of particular interest can be such kind of special passive optical components which have a shape obtainable by removing a portion of material of a rotationally symmetric body such that one or more (typically one, in various cases at most four) outside surfaces of the passive optical components are thereby formed, wherein in particular cases, these one or more outside surfaces are vertical surfaces.

Such special passive optical components can be useful, e.g., in case two passive optical component have to be arranged very close to each other and more particularly wherein their optical axes need to be arranged particularly close to each other. Furthermore, it can be desirable to mass-produce such passive optical components or sets of passive optical components comprising one or more of the described specially shaped passive optical components.

For example, in an optical module having two or more optical channels, in particular mutually parallel optical channels, such as, e.g., a proximity sensor module having an emission channel for emitting light and a detection channel for detecting light originating from the emission channel but being reflected or scattered by objects outside the proximity sensor, the described specially shaped passive optical components may find application; e.g., in such a way that each passive optical component of a set is assigned to exactly one of the optical channels and/or that each channel comprises a different one of the passive optical components of a set. And the herein described ways of manufacturing may be applied for manufacturing corresponding passive optical components or sets of passive optical components, e.g., pairs of lenses, or devices such as proximity sensors comprising such passive optical components or sets of passive optical components.

In the U.S. provisional patent application with Ser. No. 61/577,965 filed on Dec. 20, 2011 having the title OPTO-ELECTRONIC MODULE AND DEVICES COMPRISING THE SAME, devices such as opto-electronic modules and in particular proximity sensors are described in which the passive optical components described in the present patent application can find application, e.g., as lenses. In this currently still unpublished patent application, proximity sensors and ways of manufacturing the same are described in great detail. Therefore, said U.S. provisional patent application with Ser. No. 61/577,965 is hereby incorporated by reference in its entirety in the present patent application.

Envisaged applications include not only proximity sensors, but also any kind of optical devices and modules, opto-electronic modules and devices and also other sensors such as, e.g., ambient light sensors, array cameras, computational cameras and other multi-channel optical devices and apparatuses.

Thus, an object of the invention is to provide new ways of manufacturing optical structures.

The optical structures can in particular comprise or more particularly be passive optical components, and even more particularly lenses.

Another object of the invention is to provide new ways of manufacturing a set of at least two optical structures, in particular a multitude of such sets.

Another object of the invention is to provide new ways of manufacturing devices, e.g., optical modules, opto-electronic modules, wafers, photographic devices, communication devices, comprising optical structures.

Another object of the invention is to provide a way of manufacturing optical structures or sets of optical structures or other devices in a particularly efficient way.

Another object of the invention is to provide the so-manufactured optical structures, sets of optical structures and devices themselves.

Another object of the invention is to provide new optical structures, more particularly passive optical components having a specifically shaped aperture.

Further objects emerge from the description and embodiments below.

At least one of these objects and of the objects mentioned farther below for the various aspects of the invention is at least partially achieved by apparatuses and methods according to the patent claims.

In a first aspect, the invention relates to specific optical structures or sets of optical structures, and to their manufacture; in particular wherein such an optical structure comprises a passive optical component, more particularly exactly one passive optical component.

It has been found that producing, on wafer level, a multitude of precursor optical structures and subsequently removing material from the precursor optical structures can be a very efficient way of manufacturing specially shaped passive optical components such as lenses with unusual lens apertures, e.g., truncated lenses. The aperture shape of the passive optical components may be, e.g., triangular; rectangular; circular (or, more generally, elliptic) with a straight (or even curved) edge where a portion of material is removed; circular (or, more generally, elliptic) with two or more straight (or even curved) edges where one or more portions of material are removed; circular (or, more generally, elliptic) with two or more straight edges where one or more portions are removed, wherein the edges are mutually perpendicular or parallel; circular (or, more generally, elliptic) with an opening inside the circle (or, more generally ellipse), in particular wherein that opening is centered with respect to the circle (or, more generally, ellipse) and/or wherein that opening itself is circular (or, more generally, elliptic). The first aspect, but also the other aspects of the invention, and also these examples apply in particular to lenses (as passive optical components), more particularly to refractive lenses such as convex lenses (and more particularly plan-convex lenses) and concave lenses (and more particularly plan-concave lenses), but also to diffractive lenses and to diffractive-and-refractive lenses.

Generally, and also this applies to any aspect of the invention (unless explicitly stated differently), the optical structures (and corresponding passive optical components) may be produced in any known way. Of particular interest in conjunction with the present invention (and more particularly also with its first aspect), however, is manufacturing the precursor optical structure using replication and more specifically embossing. Furthermore, and also this applies to any aspect of the invention (unless explicitly stated differently), when a part or an object, such as, e.g., a master, a precursor master, a tool, a precursor tool, a master wafer, a replication tool, a final replica, is described to be manufactured using replication, this can more specifically refer to its manufacture using embossing and even more specifically to its manufacture using embossing with flow control, cf. below (in the further description of the first aspect of the invention) for details concerning embossing with flow control. Embossing with flow control can allow to obtain particularly precise results even in high-volume mass production. And, it is mainly envisaged to produce the precursor optical structures on wafer level and/or to carry out the removal of material on wafer level, usually both on wafer level.

For the removal of material from precursor optical structures, various techniques may be applied, in particular
  sawing, e.g., using a dicing saw such as dicing saws used for separating (dicing) semiconductor wafers;
  laser cutting;
  laser ablation;
  water jet cutting;
  milling;
  micro-machining;
  microtoming;
  cutting using a blade;
  punch cutting (using a punch cutter).

For some of the techniques, it may be of advantage to cool down the precursor optical structure (usually a whole wafer) before application, in particular in case of milling, micro-machining, microtoming and punch cutting.

Punch cutting is likely to result in unsatisfactory edges of the passive optical components, at least for demanding applications and for sizes of typically envisaged passive optical components, which is laterally below 4 mm and more particularly below 2 mm, and vertically below 1 mm.

Microtoming is a technique well known in microscopy and histology, wherein a sharp blade is used for separating or cutting off material. (Laser microtomes are considered as a kind of laser cutting.)

Micro-machining and milling are well known techniques which can make possible precise and high (optical) quality results and a high throughput. The same applies (at usually even higher throughput) to water jet cutting, laser ablation and laser cutting and also to sawing.

Laser cutting and sawing, in particular sawing using a dicing saw, appear particularly suitable for envisaged wafer-level manufacture of high-quality products. Whereas sawing usually results in removal of material along straight lines only, laser cutting may be applied to achieve cutting lines of virtually any shape and any curvature. And for manufacturing passive optical components (e.g., lenses) with an inner edge, i.e. with material removed at an inner portion of the aperture, laser cutting as well as laser ablation are very well suitable.

If material of the precursor optical structures is removed along a straight line passing, a multitude of precursor optical structures, this may be accomplished, e.g., in one of the following two ways:

one precursor optical structure results, after said removal of material, in one resulting structure, or from one precursor optical structure remains, after said removal of material, a single resulting structure, in which case the removal of material creates a single straight edge at the resulting structure;

one precursor optical structure results, after said removal of material, in two resulting structures, in which case the removal of material creates two straight edges, in other words, the precursor optical structure is divided by the removal of material.

Applying the second case, approximately twice as many resulting structures may be produced per time compared to the first case.

In the first case, it may, as a first sub-case, be provided that the resulting structures are located all on one side of said straight line; or it may, as a second sub-case, be provided that a portion of the resulting structures is located on one side of said straight line and another portion of the resulting structures is located on the other side of said straight line. In the first sub-case, it may, e.g., be provided that the precursor optical structures from which material is removed along said straight line, are arranged along a straight line usually parallel to the before-addressed straight line. In the second sub-case, it may, e.g., be provided that the precursor optical structures from which material is removed along said straight line, are arranged to form two straight lines usually parallel to the before-addressed straight line. Applying the second sub-case, approximately twice as many resulting structures may be produced per time (or length of a line along which material is removed) compared to the first sub-case.

If the precursor optical structures are present on a substrate wafer, it may be provided that the substrate wafer is divided or separated (into separate parts) by the process in which the material is removed from the precursor optical structures. But is is also possible to provide that the substrate wafer is not divided or separated (into separate parts) by said process in which the material is removed from the precursor optical structures, wherein it is even possible to provide that no material is removed from the substrate wafer by the process in which the material is removed from the precursor optical structures.

As will become clear below, the third aspect of the invention (cf. below) may partially be closely related to the above second case. It is partially possible to produce similar structures, and it is partially possible to use identical processing steps and techniques.

Generally, a resulting structure (resulting from the removal of material) may be identical with the passive optical component to be produced; or it may comprise the passive optical component to be produced and, in addition, additional material, in particular a surrounding portion at least partially (typically laterally) surrounding the passive optical component. This may in particular be the case when the precursor optical structure already comprises a main portion and, in addition, a surrounding portion at least partially surrounding the main portion. And this again may in particular be the case when manufacturing the precursor optical structures using embossing, and when in the embossing not-hardened replication material (liquid, viscous or plastically deformable hardenable material) is present between a replication tool and a substrate, and when the replication tool together with the substrate not fully enclose the replication material, but form a volume open to the outside allowing replication material to spread out of a volume portion in which said main portion will be formed and to an outside volume portion where said surrounding portion will be formed. We refer to such a way of carrying out replication as embossing with flow control, because for achieving desired replicas this way, it is important to carefully control the flow of replication material during embossing. Note that in such a process, it usually applies that the main portion and the surrounding portion are manufactured in one and the same process, and that they are made of the same (replication) material and that they form a unitary part.

The above-described removal of material from a precursor optical structure comprising a main portion and a surrounding portion in many cases comprises both, removing material from the surrounding portion and removing material from the main portion. But it may also be the case that material is removed merely from the surrounding portion, or that material is removed merely from the main portion. The latter can be the case, e.g., when material is removed solely from an inner portion of the main portion (thus creating an inner edge); the before-last mentioned case may be used, e.g., for producing a passive optical component which is surrounded to a smaller extent by the surrounding portion than was the case for the precursor optical structure, wherein this way, a modification of the passive optical component—such as for producing, by said removal of material, a specially shaped passive optical component—is not achieved, in contrast to the other described ways of carrying out the first aspect of the invention, by means of which this is possible.

The first aspect of the invention comprises in particular the following methods and devices:

A method for manufacturing a device comprising an optical structure, said method comprising the steps of a) providing a substrate on which a multitude of precursor optical structures is present;

b) removing material from each of said multitude of precursor optical structures.

And: The above method, wherein step b) comprises carrying out a processing step along a line by which material is removed from a plurality of said multitude of precursor optical structures, in particular wherein said line is a straight line.

And: One or both above methods, wherein step b) comprises producing an inner edge of said optical structure, in particular wherein said edge describes an elliptic line.

And: A device comprising a substrate and a passive optical component present on said substrate, said passive optical component comprising an opening.

In a second aspect, the invention relates to sets of at least two passive optical components each and to the manufacture of a set of at least two passive optical components, and more particularly to the manufacture of a multitude of such sets.

One object of the invention in its second aspect is to provide a new way of manufacturing devices comprising at least two passive optical components, in particular in mass production.

Another object of the invention in its second aspect is to provide miniaturized devices, in particular miniaturized optical modules.

In such a set of passive optical components, the positions of the passive optical components of the set are mutually fixed. It has been found that it can be, in certain applications, desirable to have two (or more) passive optical components arranged particularly close to each other, in particular to have them arranged such that optical axes of the passive optical components are particularly close to each other. Depending on the way of manufacture of the passive optical components, a standard way of proceeding may not allow to achieve a desired nearness of the passive optical components. The above-mentioned incorporated U.S. provisional patent application with Ser. No. 61/577,965 describes examples where such a set of tightly arranged passive optical components can be advantageous to have, namely in a two-channel device such as a proximity sensor.

In a specific view, the second aspect comprises that the passive optical components of the set are—or at least one of them is—manufactured using replication, more particularly embossing, even more particularly embossing with flow control details of which have been explained above in conjunction with the first aspect. In another, though similar view, the second aspect comprises that at least one of the passive optical components of the set, in particular each of them, is comprised in an optical structure comprising said passive optical component as a main portion and, in addition, a surrounding portion at least partially surrounding the main portion. Such optical structures have already been described above in conjunction with the first aspect of the invention (cf there for details). In a further view, the second aspect comprises that the passive optical components of the set are—or at least one of them is—manufactured using replication. Replication, in particular in combination with recombination is known in the art and described, e.g., in WO 2007/140 643 A1, cf. there for details. As to the terminology concerning replication and recombination: A master is a positive, i.e. it represents a structure to be finally obtained (referred to as final replica), e.g., a master lens or a master wafer, the latter comprising a multitude of structures each representing the structure to be finally obtained. A tool, on the other hand, is a negative, i.e. it represents a negative of structure to be finally obtained, e.g., a recombination tool or a replication tool, the latter usually comprising a multitude of structures each representing a negative of the structure to be finally obtained, i.e. a negative of a final replica. Thus, a replication tool can be, in many cases throughout the present application, wafer-level replication tool. A recombination tool is used to replicate, in a multitude of replication steps, a set of one or more structures a multitude of times on a substrate; in this way, a master wafer may be obtained. These explanations of terms apply to any aspect of the invention.

A first sub-aspect of the second aspect relates to a tool (more specifically to a recombination tool or possibly also to a "final" replication tool) and its use, more specifically its use for manufacturing sets of two or more passive optical components, in particular where at least one of the passive optical components (in particular each of them) is a truncated passive optical component such as a plan-convex spherical lens with a non-circular lens aperture. The tool is obtained by removing material from a precursor tool (at its surface used for replication, referred to as replication surface). This is remarkable since, from the above-cited prior art document WO 2009/023465 A2, it is known to use molds providing effectively a volume defined by its replication surface which is smaller than a volume it would have if it were made for obtaining a respective not-truncated passive optical component. In other words, from prior art, it is known to use a tool which would be obtainable by adding material to the tool (with respect to a tool for obtaining a respective not-truncated passive optical component), in contrast to the here-proposed tool obtained or at least obtainable by removing material from a precursor tool. In particular, a logical interconnection between the proposed tool and its precursor tool is that by carrying out a replication step using the proposed tool, a passive optical component may be obtained which is obtainable by truncating a passive optical component obtainable by carrying out a replication step using the precursor tool.

For said removal of material, various techniques may be applied, in particular
sawing, e.g., using a dicing saw such as dicing saws used for separating (dicing) semiconductor wafers;
laser cutting;
laser ablation;
water jet cutting;
milling;
micro-machining;
microtoming;
cutting using a blade;
punch cutting (using a punch cutter).

Particularly useful appear to be laser cutting and cutting using a blade. They are well controllable techniques allowing to create well-defined cutting surfaces in a predictable way.

There are at least three remarkable ways of realizing the first sub-aspect.

In a first way of realizing the first sub-aspect, a first precursor tool and a second precursor tool are manufactured. Then, material is removed at least from the first precursor tool, usually also from the second precursor tool, and the two so-obtained tools are combined to become the sought tool (recombination tool or "final" replication tool), e.g., by mechanically fixing them with respect to each other such as by fixing them to a common holder or substrate. In case material is removed from the first and from the second precursor tool by producing an (outer) edge in each of them, the so-obtained tools can in particular be fixed relative to each other in such a way that the respective edges face each other. Said produced edge may be, e.g., curved or, rather, straight. The finally obtained tool can allow to produce a set of two passive optical components (such as two lenses) in a single embossing step, in particular wherein the two passive optical components may be located particularly close to each other.

If the finally obtained tool is a recombination tool, it can be used for manufacturing, in N recombination steps (embossing steps), a master wafer comprising a multitude of N sets of shapes for two passive optical components, in particular wherein the two shapes for the passive optical components may be located particularly close to each other. The master wafer can be used for manufacturing, in a single embossing step, a (wafer-level) replication tool for hence manufacturing, in a single embossing step, a replica of N of said sets of passive optical components on one wafer which thereafter will usually be separated into N parts, each part usually comprising one set of said passive optical components.

If the finally obtained tool is a "final" replication tool, it can be used for manufacturing, in a single embossing step, a final replica, i.e. one set of passive optical components. This embossing may be carried out repeatedly on one wafer which thereafter will usually be separated into a multitude of parts, each part usually comprising one set of passive optical components.

It is readily understood that this idea can simply be generalized to three or four or possibly even more precursor tools, in case sets of three or four or more (close-by) passive optical components shall be manufactured.

Note that making use of this first way of realizing the first sub-aspect, two or more, in particular all of the passive optical components of a set (and, correspondingly, two or more, in particular all of the respective tool constituents of the final tool) may, in general, be differently shaped; but they may, however, also be identically shaped.

In a second way of realizing the first sub-aspect, a precursor tool suitable for manufacturing a single passive optical component in one embossing step is manufactured and then, material is removed from that precursor tool. The so-obtained tool is then used for manufacturing one or more sets of passive optical components (each set comprising two or more passive optical components). Two or more of the passive optical components of a set will thus be usually identically shaped, typically all of them. In order to obtain a single set of passive optical components, the tool is used at least twice, more particularly, it is applied in at least two successive embossing steps.

In case material is removed from the precursor tool by producing an (outer) edge (e.g., curved or, rather, straight), the so-obtained tool can in particular be used for a first passive optical component of a set in a different rotational orientation than for a second passive optical component of the same set. Said rotational orientation refers to a rotation about a vertical axis, said axis usually coinciding with an axis along which a movement of the tool during embossing is accomplished. It can, in particular be advisable to harden, e.g., cure, the replication material between an embossing step for manufacturing a first passive optical component of a set and an embossing step for manufacturing a second passive optical component of a set. More particularly, replication material of a first passive optical component of a set is hardened before applying replication material for a second passive optical component of a set. E.g., if a set of two (a first and a second) passive optical components shall be manufactured, the sequence of steps may be selected as follows:

applying (on a substrate) replication material for the first passive optical component;
embossing the tool, in a first rotational orientation, in the replication material;
hardening the replication material;
removing the tool;
applying (on the substrate) replication material for the second passive optical component;
embossing the tool, in a second rotational orientation (different from the first rotational orientation), in the replication material;
hardening the replication material;
removing the tool.

This way, a set of two passive optical components may be produced which are located particularly close to each other.

The first and second rotational orientations may in particular be rotated 180° (e.g., ±15° or even)±5° with respect to each other; e.g., in such a way that respective edges produced by removal of material face each other.

If N such sets shall be manufactured, one can, e.g., repeat the first four steps N times, thus manufacturing the first passive optical components of the N sets, and then repeat the second four steps N times, thus manufacturing the second passive optical components of the N sets. Or, the sequence of the eight steps can be repeated N times.

If the tool is a recombination tool, it may be used for manufacturing a master wafer comprising a multitude of N sets of M passive optical component in N times M embossing steps, in particular wherein the M passive optical components of a set may be (in particular at least pair-wise) located particularly close to each other. The master wafer may be used as described above (cf. the above-described first way), for manufacturing final replicas.

If the obtained tool is a (final) replication tool, it can be used for manufacturing, in M embossing steps, a replica of one set of M passive optical components. The embossing may be done repeatedly on one wafer which thereafter will usually be separated into a multitude of parts, each part usually comprising one set of passive optical components.

In a third way of realizing the first sub-aspect, a precursor tool suitable for manufacturing a set of two or more passive optical components in one embossing step is manufactured and then, material is removed from that precursor tool. In particular, the precursor tool may form—at least where it forms its replication surface—a unitary part. The so-obtained tool is then used for manufacturing one or more sets of passive optical components comprising two or more passive optical components each. It can be used for manufacturing a master wafer (by recombination), or for directly obtaining final replicas by replication, in particular by embossing.

The obtained tool may furthermore be used in any way described above for the first way of carrying out the first sub-aspect.

The precursor tool may, in general (and not limited to a specific way of carrying out the first sub-aspect of the second aspect of the invention) be manufactured in any known way, but more specifically, it may be manufactured using replication using a master forming, at least in part, the shape of one set of passive optical components to be manufactured. Such a master may be manufactured, e.g., using milling, micro-machining or laser ablation. A master may in particular be of rotational symmetry, at least where it forms its replication surface. A master may be, at least where it forms its replication surface a unitary part, or at least a contiguous part. But, it is also possible to provide that the master is composed of two or more precursor masters, typically one per passive optical component to be comprised in a set. E.g., such precursor masters may be fixed with respect to each other, such as by fixing them on a common substrate or a common holder. Diamond turning can be, besides the above-mentioned techniques, a suitable choice for manufacturing a precursor master. It is possible to provide, in particular if the final replicas of a set shall be, at least in part, very close to each other, that material is removed from one or more precursor masters before forming the master, e.g., using one or more of laser cutting, sawing, microtoming, micro-machining.

An example: For manufacturing sets of two identical truncated plane-convex spherical lenses, two precursor masters are manufactured; e.g., using diamond turning, each describing—at least in the region where it forms its respective replication surface—the shape of a convex spherical lens. Forming a flat surface, a portion of each of the precursor masters is removed, e.g., by laser cutting, wherein that cut may cut through the spherical portion of the respective master. Then, the precursor masters are attached to each other at their respective flat faces, or they are fixed to a (laterally extended) substrate, with no distance or with a non-zero distance between the flat surfaces. By embossing the so-obtained master in replication material and hardening, the sought precursor tool can be obtained—from which, then, material is removed in the region of the flat surfaces in order to obtain the (sought) tool.

Note that in any of the three described ways, a precursor tool may be manufactured by replication (in particular by embossing) using a master, the master, e.g., a master lens, may be manufactured using diamond turning and/or other techniques, as mentioned else where in the description. The master may have—at least substantially (in the region where it forms its replication surface)—a rotational symmetry (with respect to a vertical axis). E.g., the master may comprise a main portion having an at least substantially spherical shape. And it may comprise a surrounding portion at least partially surrounding the main portion which may also have a rotational symmetry. Alternatively, the precursor tool might be manufactured otherwise, i.e. without use of a master, e.g., by one or more of diamond turning, micro-maching, milling, laser ablation.

A second sub-aspect of the second aspect relates to a master and its use, more specifically its use for manufacturing sets of two or more passive optical components, in particular where at least one of the passive optical components (in particular each of them) is a truncated passive optical component. The master is obtained by adding material to a precursor master (at its replication surface). The added material will thus contribute to the master's replication surface. Although the presently described sub-aspect is of particular interest for finally producing (sets of) passive optical components located particularly close to each other, it can also be valuable otherwise, e.g., for manufacturing single passive optical components, in particular truncated passive optical components such as truncated lenses.

The added material usually forms a protruding portion of the master.

The so-obtained master can then be used for manufacturing a tool which again can be used for either directly manufacturing the sought passive optical components (i.e. the final replicas), or rather for manufacturing a master wafer (by using the tool as replication tool). The master wafer can be used for manufacturing a replication tool, and the passive optical components to be finally manufactured, i.e. the final replicas, can then be obtained using the replication tool, for obtaining a multitude of passive optical components in a single embossing step.

By means of the addition of the material to the precursor master, the presence of an empty volume portion in a manufactured tool or final replica can be ensured. In a tool, this can correspond to the empty volume produced by removing material from a tool as described for the first sub-aspect of the second aspect of the invention.

The precursor master may be manufactured, e.g., using diamond turning, wherein diamond turning, however, is suitable mainly for rotationally symmetric bodies, i.e. for precursor masters having—at least where the replication surface is formed—rotational symmetry. In case of the below-described second way of proceeding, diamond turning may be particularly suitable. Other techniques usable for manufacturing a precursor master are, e.g., micro-machining, milling, etching, laser ablation. These may be particularly suitable in case of the first way of proceeding described below.

Note that one or more techniques may be combined in the manufacture of a precursor master.

Furthermore, in particular in case of the below-described first way of proceeding, the precursor master may be composed of two or more precursor sub-masters, each describing, at least in part, a shape of one passive optical component and obtained using, e.g., diamond turning, possibly with a subsequent removal of material, and wherein the sub-precursor masters are fixed relative to each other, so as to form the precursor master.

In a first way of proceeding, the master is used for manufacturing a tool for manufacturing, in a single replication step, a set of two or more passive optical components. Such a tool can then be proceeded with like with a tool as obtained like described for the first way of carrying out the first sub-aspect of the second aspect (cf. above).

In a second way of proceeding, the master is used for manufacturing a tool for manufacturing, in a single replication step, a single passive optical component only. Such a tool can then be proceeded with like with a tool as obtained like described for the second way of carrying out the first sub-aspect of the second aspect (cf. above).

A third sub-aspect of the second aspect of the invention relates to a master and its use for manufacturing sets of two or more passive optical components, in particular where at least one of the passive optical components (in particular each of them) is a truncated passive optical component. The master is, at least in the region where it forms its replication surface, unitary part, or at least a contiguous part. The master may be obtained using at least one of, e.g., micro-machining, milling, etching, laser ablation, in particular starting from an integrally formed body or processing in the described way an integrally formed body. The master can more precisely be shaped such that by means of a tool obtainable by replicating (in particular embossing) the master (in particular doing so only once), a master wafer and/or a final replica can be obtained without adding material to the tool or removing material from the tool in the region where the tool forms its replication surface. The master may, in particular, describe, where it forms its replication surface, at least in part, surfaces of each of said passive optical components of said set of passive optical components and, in addition, at least one protruding portion protruding therefrom. Said protruding portion may in particular be arranged between adjacent ones of the passive optical components.

If the master is used for manufacturing a tool by replication, in particular by embossing, it may be continued by manufacturing a master wafer using recombination (using embossing) using the tool (as recombination tool), and subsequently manufacturing a replication tool (using embossing) using the master wafer, and the final replicas are then manufactured using replication (again in particular embossing) with the replication tool, usually subsequently applying a separation step for singularizing the sets of passive optical components—e.g., it can be continued like in a way described elsewhere in the present patent application, e.g., for the second sub-aspect of the second aspect of the invention.

In the third sub-aspect, it can in particular be provided that at least one, in particular all of the passive optical components of a set are comprised in one optical structure each, such an optical structure comprising the respective passive optical component as a main portion and, in addition, a surrounding portion (laterally) at least partially surrounding the main portion. In that case, it can in particular be provided that the surrounding portions of at least two of the optical structures of one set overlap or partially coincide, wherein the corresponding passive optical components may be overlapping or, rather be distinct.

A fourth sub-aspect of the second aspect relates to a master and more particularly to its use for manufacturing sets of two or more passive optical components, in particular where at least one of the passive optical components (in particular each of them) is a truncated passive optical component. Firstly, only a portion of a tool is manufactured using the master, and subsequently thereto, usually after hardening that portion of the tool, a further portion of the tool is manufactured, either using the same master, or using a second master which may be identically shaped as the other master or differently shaped, but usually substantially shaped like the other master. This may be accomplished analogously to what has been described above for using tools and the manufacture of final replicas or master wafers, for the case of carrying out the first sub-aspect in the the second way.

The master may generally be shaped and composed, e.g., as described in the second or in the third sub-aspect above. The master may be obtained using at least one of, e.g., diamond turning, micro-machining, milling, etching, laser ablation, in particular starting from an integrally formed (to at least contiguous) body or processing in the described way an integrally formed body. Material may be removed from a so-obtained precursor master and/or added thereto.

More specifically, the following may be provided: The master forms (where it forms its replication surface), at least in part, the shape of one passive optical component of the set of passive optical components to be manufactured. The master is embossed into replication material applied to a substrate, which then is hardened before removing the master. Thus, a portion of the tool is manufactured. Then, further replication material is applied to the substrate, and the same master or —in particular if not all passive optical components of the set shall be identically shaped—another master is embossed therein. Then, the further replication material is hardened and subsequently, the secondly applied master is removed. Further embossing steps using one or both of the before-mentioned masters or another master may be applied in case the sets of passive optical components to be manufactured comprise more than two passive optical components each. If one and the same master is used in two embossing steps during manufacture of the tool, the master can in particular be used in different rotational orientations during these, e.g., rotated by at least approximately 180° about a vertical axis ("vertical" referring to a direction perpendicular to the surface of the substrate on which the replication material is applied).

The second aspect of the invention comprises in particular the following methods and devices:

A method for manufacturing a device comprising a set of at least two passive optical components, said method comprising the steps of A) using a tool obtainable by carrying out tool manufacturing steps, said tool manufacturing steps comprising the steps of
  i) manufacturing a precursor tool having a replication surface;
  ii) modifying said replication surface by removing material from said precursor tool.

And: The above method, wherein said tool manufacturing steps comprise the steps of
  i1) manufacturing a first precursor tool having a first replication surface;
  i2) manufacturing a second precursor tool having a second replication surface;
  ii1) modifying said first replication surface by removing material from said first precursor tool; and optionally
  ii2) modifying said second replication surface by removing material from said second precursor tool.

And: One or both of the above methods, wherein said tool manufacturing steps comprise the steps of
  i1) manufacturing a first precursor tool having a first replication surface;
  i2) manufacturing a second precursor tool having a second replication surface;
  ii1) modifying said first replication surface by removing material from said first precursor tool; and optional
  ii2) modifying said second replication surface by removing material from said second precursor tool.

And: One or both of the above two first-cited methods for the second aspect, wherein step A) comprises carrying out, in the presented order, the steps of
  r0) providing a substrate;
  r11) moving said substrate and said tool towards each other with a first portion of a replication material between them;
  r12) hardening said first portion of replication material;
  r13) moving said substrate and said tool away from each other, said hardened first portion of replication material remaining in a first location of said substrate;
  r21) moving said substrate and said tool towards each other with a second portion of a replication material between them;
  r22) hardening said second portion of replication material;
  r23) moving said substrate and said tool away from each other, said hardened second portion of replication material remaining in a second location of said substrate, wherein said first location is different from said second location.

And: One or both of the above two first-cited methods for the second aspect, wherein said tool manufacturing steps comprise the steps of
  providing one or more masters;
  manufacturing, using replication, said precursor tool using said one or more masters;
in particular wherein at least one of
  said precursor tool is, at least where it forms its replication surface, made of a replication material;
  said precursor tool forms, at least where it forms its replication surface, a contiguous part, in particular a unitary part;
  the replication surface of the precursor tool has a shape describing the negative of at least a portion of a first and of at least a portion of a second passive optical component of said passive optical components of said set.

And: A tool for manufacturing, by replication, truncated passive optical components, wherein each of said truncated optical components is a passive optical component having a shape obtainable from a precursor passive optical component by truncation creating an edge and an edge surface adjacent to said edge, said tool comprising a replication surface, said replication surface having a shape not describing said edge surface.

And: A method for manufacturing, by replication, N≥1 sets of M≥2 optical structures each, said method comprising the steps of
providing a substrate;
providing a tool for manufacturing, by replication, a first of said M optical structures of such a set;
manufacturing, by replication using said tool, N of said first optical structures on said substrate; and subsequent thereto
manufacturing, by replication using said tool or a different tool, N of said second optical structures on said substrate;
in particular wherein for each of said sets, said first and second optical structures coincide partially or overlap.

And: A method for manufacturing a device comprising a set of at least two passive optical components, said method comprising the steps of
B) using a master obtainable by carrying out master manufacturing steps, said master manufacturing steps comprising the steps of
j) providing, in particular manufacturing, a precursor master having a replication surface;
jj) modifying said replication surface by adding material to said precursor master.

And: A master for manufacturing, by replication, truncated passive optical components, wherein each of said truncated optical components is a passive optical component having a shape obtainable from a precursor passive optical component by truncation creating an edge and an edge surface adjacent to said edge, said master comprising a replication surface, said replication surface comprising a first portion describing a shape corresponding to the shape of a portion of said truncated passive optical component not comprising said edge surface, wherein at least one of
said replication surface has a shape not describing said edge surface;
said master comprises, adjacent to said first portion of the replication surface, a protruding part protruding from said first portion of the replication surface;
in particular wherein said precursor passive optical component has an at least mirror-symmetric shape (in particular an at least two-fold mirror symmetric shape) and, more particularly a rotationally symmetric shape.

And: A method for manufacturing a device comprising a set of at least two passive optical components, said method comprising the step of
C) using a master comprising a replication surface comprising, for each of said passive optical components, a first portion describing a shape corresponding to the shape of at least a portion of the respective passive optical component, said master comprising, in addition, at least one protruding portion protruding from at least one of said first portions of said replication surfaces.

And: A method for manufacturing a device comprising a set of at least two passive optical components, said method comprising the steps of
D) using a tool obtained by carrying out tool manufacturing steps, said tool manufacturing steps comprising the steps of
D1) providing a substrate;
D2) providing one or more masters each having a replication surface;

D31) moving said substrate and a first of said one or more masters towards each other with a first portion of a replication material between them;
D32) hardening said first portion of replication material;
D33) moving said substrate and said first master away from each other, said hardened first portion of replication material remaining in a first location of said substrate;
D41) moving said substrate and a second of said one or more masters identical with or different from said first master towards each other with a second portion of a replication material between them;
D42) hardening said second portion of replication material;
D43) moving said substrate and said second master away from each other, said hardened second portion of replication material remaining in a second location of said substrate, wherein said second location is different from said first location.

In a third aspect, the invention relates to sets of at least two optical structures each and to the manufacture of a set of at least two optical structures, and more particularly to the manufacture of a multitude of such sets. Therein, each optical structure comprises a main portion comprising a passive optical component and, optionally, a surrounding portion surrounding the main portion. More particularly, it relates to ways of removing optical connections between optical structures of such a set, e.g., for avoiding undesired light paths, such as avoiding that light having entered a first of the optical structures of the set (and in particular its respective passive optical component) enters a second of the optical structures of the set (and in particular its respective passive optical component).

One object of the invention in its third aspect is to provide a way of manufacturing optical modules with sets of two or more passive optical components for use in multi-channel optical devices in which the passive optical components of a set are distributed over two or more of the channels, in particular a way of manufacturing said optical modules in such a way that adjacent optical channels are optically well separated.

Another object of the invention in its third aspect is to provide a way of manufacturing devices in which adjacent optical channels are well separated.

It has been found that it can be desirable to avoid the presence of undesired light paths like those described above, in particular if a manufactured set of optical structures is used in a multi-channel optical module or device. Cross-talk between channels may be avoidable by removing material of one or both of the optical structures, more particularly by removing material between respective passive optical components.

The third aspect of the invention can be useful in particular when applied to or in conjunction with sets of optical structures and sets of passive optical components, respectively, as they have been described for the first and/or in the second aspect of the invention. A processing according to the third aspect may be considered and/or used as a post-processing step, a processing applied for refining the objects and devices described for the first and/or second aspect of the invention.

During manufacture of a set of optical structures, in particular if the respective passive optical components have to be particularly close to each other, it may happen that material of a first of the optical structures is in direct physical contact with material of a second of the optical structures, e.g., their respective surrounding portions may overlap.

Or, the optical structures are distant from each other, but so close that undesired propagation of light from a first to a second of the optical structures is possible (to an unacceptably high extent).

Partially or fully removing material of one or two close-by, adjacent or even overlapping optical structures may effect a desired optical separation of the optical structures and, more particularly of the respective passive optical components. This can be particularly useful if the third aspect of the invention is applied to multi-channel optical devices, more particularly when passive optical components of one set are distributed among two or more corresponding optical channels.

E.g., every set may comprise two optical structures each of which comprises a passive optical component and a surrounding portion surrounding the respective passive optical component, in particular wherein the two surrounding portions overlap in the region where the two passive optical components are closest to each other, and the two passive optical components are assigned to different optical channels of, e.g., a proximity sensor or an array camera. In the region of said overlap, material is removed from both optical structures (more specifically from both surrounding portions), so as to suppress or at least (strongly) reduce an optical interconnection (through material of the optical structures) between the passive optical components of the set (and, finally, between the optical channels). Thus, an optical separation or at least an improved optical separation of the optical channels can be achievable.

In a slightly different view, the removal of material is accomplished because shape or constitution of material to be removed (in particular in a region where adjacent optical structures are closest to each other, in particular overlapping) is not well-defined (or ill-defined), in particular in that said shape or constitution is not sufficiently well reproducible during the manufacture. Badly defined areas may lead to badly defined optical properties, and this usually is undesired to have. The removal of material can solve that problem by producing sufficiently well defined and reproducible conditions.

Usually, said optical structures are present on one common substrate. That common substrate usually is a wafer. The substrate can in particular be a wafer as obtained in one of the ways described concerning the first and/or, more importantly, concerning the second aspect of the invention. E.g., sets of two or more optical structures each, each optical structure comprising a passive optical component, can be manufactured by replicating, in particular embossing, a (wafer-level) replication tool, wherein the replication tool may have been obtained by replicating, in particular embossing a (wafer-level) master wafer, and said master wafer may have been obtained by recombination (using embossing) using a recombination tool obtained by replicating a master which again may have been manufactured, not by replication, but, e.g., by removing material from a body by diamond turning, laser ablation, micromachining, milling, or etching.

Removing material optically interconnecting optical structures of a set may be accomplished particularly efficiently when carried out on wafer level. In particular, this can allow to remove material of a plurality of optical structures in a single processing step. Removing the material can in particular be accomplished along a line, more particularly such that material of optical structures of a plurality of sets is removed along said line. Considering the manufacture of particularly shaped passive optical components described above in the first aspect of the invention, it must be noted that techniques and the ways of applying the techniques as described for the first aspect of the invention (cf. above) can also be applied here, in case of the third aspect of the invention.

In particular, for example, one or more of the following techniques may be used for the removal of material: sawing (in particular using a dicing saw), laser cutting, laser ablation, micro-machining, milling. Whereas the other mentioned techniques are quite well suitable for removing material also along curved lines, sawing is mainly suitable for removing material also along straight lines. But even though it would be generally possible to remove (also) material of the passive optical components themselves, it is, in the presently described third aspect of the invention, usually envisaged to not change the shape of the passive optical components, but only of further material present between them such as material of surrounding portions.

Provided the optical structures are present on a (common) substrate, it can be particularly useful to not penetrate the substrate during said removal of material of the optical structures. This way, the substrate can (continue to) function so as to ensure a precise alignment and relative positioning of the optical structures (and corresponding passive optical components) of a set. In particular, it can be provided, e.g., by adjusting manufacturing parameters accordingly, that the removal of the material is accomplished from that side of the substrate on which the optical structures are present and to a depth along a vertical coordinate of at most a maximum depth and at least a minimum depth; in particular, wherein said depth is zero at the surface of the substrate on which the optical structures are present and has positive values within the substrate (and, accordingly, negative values above the substrate where the optical structures are located). Corresponding maximum depths can be, e.g., 50 µm or, more particularly 20 µm, and corresponding minimum depths can be, e.g., −50 µm or, more particularly −20 µm. The more negative the depth, the thicker the remaining material of the optical structure, which may still admit some amount undesired light propagation. The larger the depth, the more material is removed from the substrate, which creates undesired amounts of debris and may reduce the mechanical stability of the substrate. If, e.g., a dicing saw is used, the height of the blade of the dicing saw with respect to the surface of the substrate on which the optical structures are present may be adjusted (preset) to 0 µm or a value between −15 µm and 15 µm. Assuming a certain height (depth) tolerance (reproducibility) of the dicing saw amount to t µm, the finally produced depths will lie in a range of twice this tolerance centered about the preset depth. In addition, effects of a non-straight profile of the blade may add up—we shall, per default, consider the mean position between minimum and maximum position of the blade profile as a reference for the depth.

Considering carrying out the removal of material along a line, as described above, this removal of material may also be considered or referred to as trenching, i.e. as producing a trench, more particularly a trench between neighboring optical structures of a set. Even though this term may apply better when the above-defined depth has positive values, it shall refer to zero and negative depth values as well.

The width (along a lateral direction, perpendicular to the extension of the line) across which material is removed typically ranges between 20 µm to 400 µm and more particularly between 40 µm to 200 µm.

The third aspect of the invention comprises in particular the following methods:

A method for manufacturing a device comprising a set of M≥2 optical structures, said method comprising the steps of
E) providing a substrate on which a set of M precursor optical structures is present;
F) removing, while said precursor optical structures are present on said substrate, material from at least a first of said precursor optical structures;
wherein by step F), said substrate is not divided into separate parts.

And: The above method, wherein step F) is carried out along a line.

And: One or both of the above methods, wherein said first of said M precursor optical structures comprises a precursor passive optical component and, in addition, a surrounding portion at least partially surrounding said precursor passive optical component.

Note that the above-described aspects (and sub-aspects) of the invention may be combined with each other. Several examples for possible combinations have already been mentioned in the above text.

It is to be noted that the invention comprises device with features of corresponding methods according to the invention, and, vice versa, also methods with features of corresponding devices according to the invention.

The advantages of the devices basically correspond to the advantages of corresponding methods, and, vice versa, the advantages of the methods basically correspond to the advantages of corresponding devices.

Note that therein, said devices can be whatever object described above, not only what is explicitly referred above to as devices, e.g., also what is referred to above as master or tool.

Further embodiments and advantages emerge from the claims and the figures.

BRIEF DESCRIPTION OF THE DRAWINGS

Below, the invention is described in more detail by means of examples and the included drawings. The figures show schematically:

FIG. 1 an illustration of manufacturing optical structures by replication and recombination;
FIG. 2 a illustration of a wafer-level method for modifying optical structures, in a top-view;
FIG. 3 a illustration of a wafer-level method for modifying optical structures, in a top-view;
FIG. 4 a illustration of a wafer-level method for modifying optical structures, in a top-view;
FIG. 5 an optical structure in two views;
FIG. 6 an optical structure in a top view;
FIG. 7 an optical structure in a top view;
FIG. 8 an optical structure in a top view;
FIG. 9 an optical structure in a top view;
FIG. 10 an optical structure in a top view;
FIG. 11 an optical structure in a cross-sectional view;
FIG. 12 optical structures in a cross-sectional view;
FIG. 13 an optical structure in a cross-sectional view;
FIG. 14 an optical structure in two views;
FIG. 15 an optical device comprising two optical structures, in two views;
FIG. 16 an optical device comprising two optical devices, in a cross-sectional view;
FIG. 17 a illustration of a wafer-level-suitable method for modifying optical structures, in two views;
FIG. 18 a illustration of close-by passive optical components, in a cross-sectional view;
FIG. 19 an illustration of close-by truncated passive optical components, in a cross-sectional view.

Figure 20:
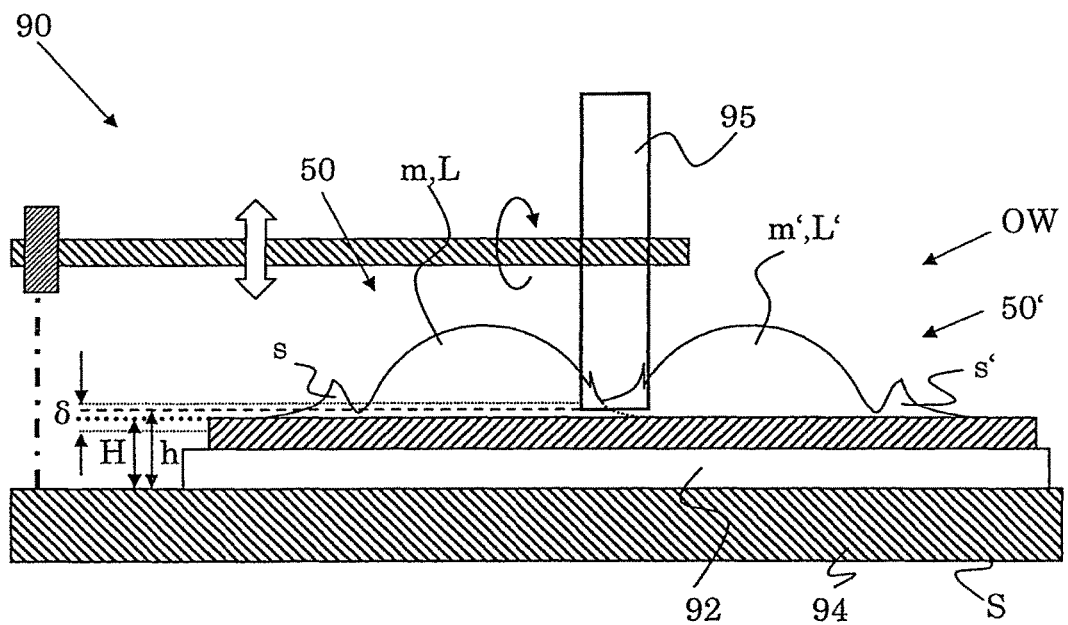
FIG. 20 an illustration of a method for removing material of optical structures of an optics wafer, using a dicing saw, in a cross-sectional view.

The described embodiments are meant as examples and shall not confine the invention.

DETAILED DESCRIPTION OF THE INVENTION

FIG. 1 is a very schematic illustration of a way of manufacturing optical structures by replication, mainly for clarifying the used terminology. The partial images are vertical cross-sections. Where coordinates x, y, z are illustrated in any of the Figures, x and y denote lateral directions, whereas z denotes a vertical direction. Shapes illustrated in FIG. 1 are strongly schematized, and for replication processes discussed further below, specific shapes and details might be required, which are not drawn in FIG. 1.

Initially, a master M is provided, e.g., by diamond turning or micromachining. Replicating the master M results in a tool T. In the next step, tool T is used as a recombination tool, creating, on a substrate S1 a multitude of replicas, such that a master wafer MW is obtained. Master wafer MW can also be referred to as sub-master or wafer-level master.

Thus, from replication material r such as a hardenable in particular curable material such as a UV or heat curable epoxy resin, a number of structures are formed on substrate S1, which may be distant from each other separated by a gap g, or (not shown) may overlap or partially coincide. Furthermore, the structures may comprise a main portion m each and a surrounding portion s surrounding the respective main portion.

In a next step, using replication, a replication tool R, also referred to as wafer-level tool, is obtained, namely by replicating master wafer MW on a substrate S2. Using this replication tool R in a replication process then results in a wafer comprising a multitude of final replicas F on a substrate S3, wherein each of these may, as illustrated in FIG. 1, comprise a main portion m and a surrounding portion s. The final replicas F can in particular be optical structures 50, e.g., wherein each of said main portions is a passive optical component and more particularly a lens such as a plane-convex refractive lens. The replication material r for the optical structures will, at least for transparent passive optical components, be a transparent one.

In a subsequent step, separation takes place, e.g., using a dicing saw, so as to obtain separate optical structures 50 or separate sets of two or more optical structures. Dicing lines are denoted by d.

The substrates S1, S2, S3 can be, e.g., blank wafers (e.g., glass or polymeric), wherein at least substrate S3 in this case would be a transparent wafer. Substrates with transparent portions and one or more (non-transparent) blocking portions are described further below and, in more detail, in particular concerning their manufacture, in the before-mentioned and incorporated U.S. provisional patent application with Ser. No. 61/577,965 to which it is hereby explicitly referred.

It is, considering the method illustrated in FIG. 1, in general also possible to directly manufacture final replicas using the tool T. And it is furthermore also, in general, possible to introduce another generation, such as to produce a second-generation master wafer using the replication tool R and, using that second-generation master wafer, producing a second-generation replication tool using that second-generation master wafer. Final replicas are then made using that second-generation master wafer. It is therein also possible to provide that the second generation master wafer and replication tool are larger (as to their lateral area) than those of the previous generation, having provisions for a multiple of optical structures (and passive optical components) compared to the previous generation. And it is also possible to manufacture, as a first step, a tool instead of a master, e.g., using diamond turning or micromaching and start replication from that point.

It is, using the described technique, possible to create various miniaturized passive optical components such as prisms or curved mirrors (usually requiring a coating step) and in particular various lenses, concave, convex and diffractive ones and others.

In the following, various ways of modifying, in particular shaping optical structures shall be described, wherein this may in particular take place on a substrate on which many optical structures are present, e.g., on a wafer with final replicas F like obtained and illustrated in FIG. 1.

FIG. 2 illustrates, in a top-view, a portion of a wafer for illustrating a wafer-level method for modifying optical structures 50. On the wafer, a multitude of precursor optical structures 5 having a circular aperture are present. By dicing along (relatively broad) dicing lines d, material is removed from the precursor optical structures 5, thus effecting a smaller aperture of these. The precursor optical structures 5 may, e.g., be or comprise spherical lenses having a circular lens aperture (which may apply also to other illustrated cases). By the processing, material 59 is removed from the precursor optical structures 5, such that the so-obtained lenses have a lens aperture describing a truncated circle, truncated along a straight line.

Dicing along other dicing lines such as dicing lines d' may take place, too, for separating the optical structures.

Note that lines 99 along which material is removed are not lines in the mathematical sense having no width, but they have a width.

In the case illustrated in FIG. 2, a line 99 along which material is removed from the precursor optical structures 5 coincides with a dicing line d. This can be a very efficient process. The illustrated process is particularly efficient also for the reason that precursor optical structures present on both sides of line 99 are processed, in the illustrated case even simultaneously.

FIG. 3 is an illustration, in a top-view, of another wafer-level method for modifying optical structures. In this case, removal of material of the precursor optical structures 5 does not coincide with cutting through the substrate (dicing), and line 99 along which material is removed from the precursor optical structures 5 does not coincide with dicing lines d or d'.

In FIGS. 2 and 3, the non-shaded portions of precursor optical structures 5 indicate the (aperture) shape of the so-obtained optical structures 50 such as, e.g., truncated lenses.

FIG. 4 is another illustration, in a top view, of a wafer-level method for modifying optical structures. In this case, the line 99 is not a straight line, but it is curved. This may be accomplished, e.g., using laser cutting or laser ablation. The resulting optical structures 50 may thus have rather peculiar apertures.

FIG. 5 illustrates an optical structure 50 obtainable in such a way (cf. FIG. 4), in two views; on top in a cross-sectional view and below in a (lateral) top view. The precursor optical structure may in this case have been a spherical plane-convex lens having an optical axis A coinciding with its axis or rotational symmetry.

FIGS. 6 and 7 illustrate optical structures 50 in a top view which are obtainable from precursor optical structures with circular aperture by removing material 59 therefrom along two and four lines, respectively.

FIG. 8 illustrates an optical structure 50 obtainable from a precursor optical structure with an elliptic non-circular aperture by removing material 59 therefrom along two lines.

By the processing, it is not only possible to remove material from a precursor optical structure in such a way that at an outer edge and and outer edge surface is produced, but it is also possible to remove an inner portion, more particularly a laterally inner portion of the precursor optical structure. And, a removal of material does not necessarily have to take place along a line; it may, e.g., also take place point-wise.

FIG. 9 shows an example in which only an inner edge is produced, e.g., by point-wise removal of material. Material 59 is removed in the center of the initially purely circular aperture; thus, a hole is created in the optical structure. The aperture of the so-produced optical structure is ring-shaped. But also differently shaped openings can be produced. So-produced inner edges and inner edge surfaces may have various shapes. Techniques suitable for removing portions of material not creating an outer edge are, e.g., laser ablation, micro-machining, milling. These may be applied on wafer level.

FIG. 10 illustrates an optical structure 50 obtainable from a precursor optical structure with a circular aperture by removing material 59 therefrom creating both, an inner and and outer edge.

FIG. 11 illustrates an optical structure 50 in a cross-sectional view. It illustrates that a dicing line d along which material is removed from an (in this case plane-concave spherical) precursor optical structure may also leave a portion of the removed material 59 intact. Furthermore, it illustrates that on a substrate S, optical structures and in particular precursor optical structures may be present on both sides, cf. the dotted lines.

FIG. 12 illustrates optical structures 50 and 50' in a cross-sectional view. These are obtainable simultaneously by dicing or cutting along line 99, starting from a precursor optical structure or passive optical component having a circular or elliptic aperture.

FIG. 13 illustrates another optical structure 50 in a cross-sectional view. In this case, material 59 is removed from a precursor optical structure along a line 99 (drawn as a rectangle) without separating substrate S into distinct parts or, at least, without penetrating substrate S. Various techniques may accomplish such a task, e.g., micro-machining, laser ablation, sawing, milling. The dotted shape symbolizes the possibility to provide optical structures on both sides of substrate S.

FIG. 14 illustrates an optical structure 50 in two views, cross-section on top, top view below. This optical structure 50 may be obtained by removing material (substantially) without removing material from the substrate S. In the upper portion, the edge surface 5s is indicated. This edge surface 5s forms an outside surface of the optical structure 50, and it is in this case a perfectly vertical surface. Depending on the processing technique by means of which material is removed, the shape of the edge surface in a vertical cross-section can also be not perfectly straight, e.g., (somewhat) curved. Furthermore, FIG. 14 illustrates that it is possible to use substrates S comprising transparent portions t and non-transparent blocking portions b laterally surrounding the transparent portions. This may contribute to improved optical properties, e.g., by impeding undesired optical paths.

FIG. 15 illustrates an optical device 1a comprising two optical structures 50, 50', in two views, cross-sectional view above, top view below. In this case, it is again illustrated that substrates S with transparent portions t and one or more non-transparent blocking portions b laterally surrounding the transparent portions. In the lower portion of FIG. 15, the removed material 59 is indicated, too. Edge surface 5s and the corresponding (line-shaped) edge 5e are also indicated. Such an optical device 1a may be used, e.g., in multi-channel optical devices such as in proximity sensors and array cameras. It is possible to provide that dicing takes place in a wafer stack. More details concerning such a way of manufacturing can be inferred from the before-mentioned incorporated U.S. provisional patent application with Ser. No. 61/577,965, where this is explained by means of the example of a proximity sensor.

FIG. 16 illustrates an optical device 1 comprising two optical devices 1a in a cross-sectional view. The optical devices 1a may be obtained, e.g., like described for FIG. 11. These two are mounted, e.g., using pick-and-place, on a substrate S' which may, as illustrated in FIG. 16, have transparent portions t' and one or more blocking portions b'.

FIG. 17 is an illustration of a wafer-level-suitable method for modifying optical structures 50, in two views, cross-section on top, top view below. The precursor optical structure has in this case a main portion m laterally surrounded by a surrounding portion s. Main portion m forms a passive optical component, more particularly a lens. Such precursor optical structures may also be used in the other described embodiments in which case surrounding portions would have to be imagined to be present around the passive optical components formed by the illustrated precursor optical structures.

In the lower part of FIG. 17, it is illustrated that removal of material 59 may take place along line 99 removing material of surrounding portion s only, leaving main portion m unchanged. This may be useful, e.g., when two passive optical components formed by neighboring optical structures (more particularly by their respective main portions) shall be very close to each other, while still ensuring well-defined optical properties. E.g., in such a case, surrounding portions of neighboring precursor optical structures may overlap, and subsequently, the material in the overlap region is removed, e.g., for inhibiting the possibility of undesired light propagation through the surrounding portions.

Instead of removing material along a straight line, it would also be possible, e.g., to completely remove one or more (possibly overlapping) surrounding portions, e.g., using laser ablation or micro-machining along a circular line.

FIG. 18 very schematically illustrates, in a cross-sectional view, two precursor optical structures 5,5', one in solid lines, one in dotted lines, which are differently distanced from each other. The optical structures 5 each comprise a main portion m and a surrounding portion s, the main portion m substantially forming a passive optical component L, more particularly a planar-convex lens.

In the upper third of FIG. 18, a gap g is present between the optical structures 5,5'. Depending on how these are manufactured, a certain minimum gap (distance) has to be present. This poses, considering, in addition, a certain minimum width (lateral extension) of the surrounding portions, a limit to the minimum distance between the passive optical components L and between their respective optical axes A, A'. Note that practically the same considerations are valid also in case of close-by optical structures not comprising a surrounding portion and to corresponding passive optical components.

In the middle third of FIG. 18, is very schematically illustrated that one can have the surrounding portions overlapping or partially coinciding. This allows to have passive optical components L and their respective optical axes A, A' closer to each other, but usually at the cost of (optically) ill-defined conditions in that overlap region. Ways of remedying this problem by removing material of the optical structures and, more particularly, of the surrounding portions, have been described above, cf., e.g., FIGS. 13 and 14. Furthermore, farther below, ways of manufacturing sets of optical structures with overlap will be described.

In the lower third of FIG. 18, is very schematically illustrated that one can also provide that the main portions overlap or partially coincide. This allows to have passive optical components L and their respective optical axes A, A' even closer to each other, but again usually at the cost of (optically) ill-defined conditions in that overlap region. Ways of remedying this problem by removing material of the optical structures have been described above, cf., e.g., FIGS. 13 and 14, wherein usually, truncated passive optical components will be produced this way. It is furthermore referred to the farther below described ways of manufacturing sets of optical structures with overlap.

There are cases in which the use of a truncated passive optical component such as a truncated lens can be acceptable or even desirable. This can be a way of realizing a set of two (or more) passive optical components having optical axes which are particularly close to each other. Truncated optical structures and passive optical components have been described above along with ways of manufacturing the same, cf., e.g., FIGS. 2, 5, 6, 7, 13, 14. Sets of truncated optical structures and passive optical components, respectively, have been described above as well as ways of manufacturing the same, cf., e.g., FIGS. 15 and 16. Further ways of manufacturing truncated optical structures and passive optical components and sets of these will be described farther below.

FIG. 19 is a illustration of close-by optical structures 5, 5' comprising truncated passive optical components, in a cross-sectional view. In FIG. 19, optical structures 5, 5' with main portions and surrounding portions are illustrated. In the upper part of FIG. 19, a gap g is provided between the optical structures 5 and 5'. Comparing this to the upper third of FIG. 18, however clearly shows that a much smaller (lateral) distance between the axes A, A' (and between the two passive optical components) is readily obtained due to the truncated apertures.

As very schematically illustrated in the lower portion of FIG. 19, an even smaller distance between the axes A, A' (and between the two passive optical components) is achievable when the surrounding portions s of the optical structures overlap. The problems possibly occurring in case of very close-by and in particular overlapping optical structures have be mentioned above, and the ways of overcoming these referred to above can be applied here as well.

In conjunction with FIG. 20, a particular way of removing material between passive optical components will be explained in greated detail. Even though the process will be explained for the case of not penetrating the (wafer) substrate, i.e. of not simultaneously dicing, it will be obvious from the explanations how to adapt the method for doing so.

FIG. 20 very schematically illustrates, in a cross-sectional view, a method for removing material of close-by optical structures 50, 50' of an optics wafer OW, using a dicing saw 90. Optics wafer OW can be a wafer with final replicas (cf. FIG. 1).

Dicing saw 90 comprises a rotatable sawing blade or dicing blade 95, and a saw table or dicing chuck 94. Between optics wafer OW and sawing table 95, an intermediate layer 92 such as a dicing tape is present. The (adjustable) height of blade 95, more particularly of its lower edge, is usually referenced with respect to the upper surface of sawing table 94, i.e. it is zero when blade 95 would slightly touch sawing table 94. In usual dicing, the so-referenced height is chosen to be (clearly) above zero (in order to protect the sawing table 94) and to be below the thickness of the intermediate layer 92. This way, it is ensured, in the common way of using a dicing saw, that the wafer to be diced is on the one hand indeed separated into distinct parts and that blade 95 on the other hand does not get into contact with sawing table 94.

However, in the here-suggested way of using a dicing saw 90, the height h is adjusted differently. It is preset to be larger than the thickness of the intermediate layer 92. Usually, it will be preset to a value within a narrow range (such as plus-minus 30 µm) around the sum H of the thicknesses of intermediate layer 92 and substrate S, in particular centered about this sum H of heights. The range is referenced as δ in FIG. 20.

Adjusting the height h as described, dicing saw 90 can be efficiently used for the above-described removal of material or separation of optical structures.

Figure 21:
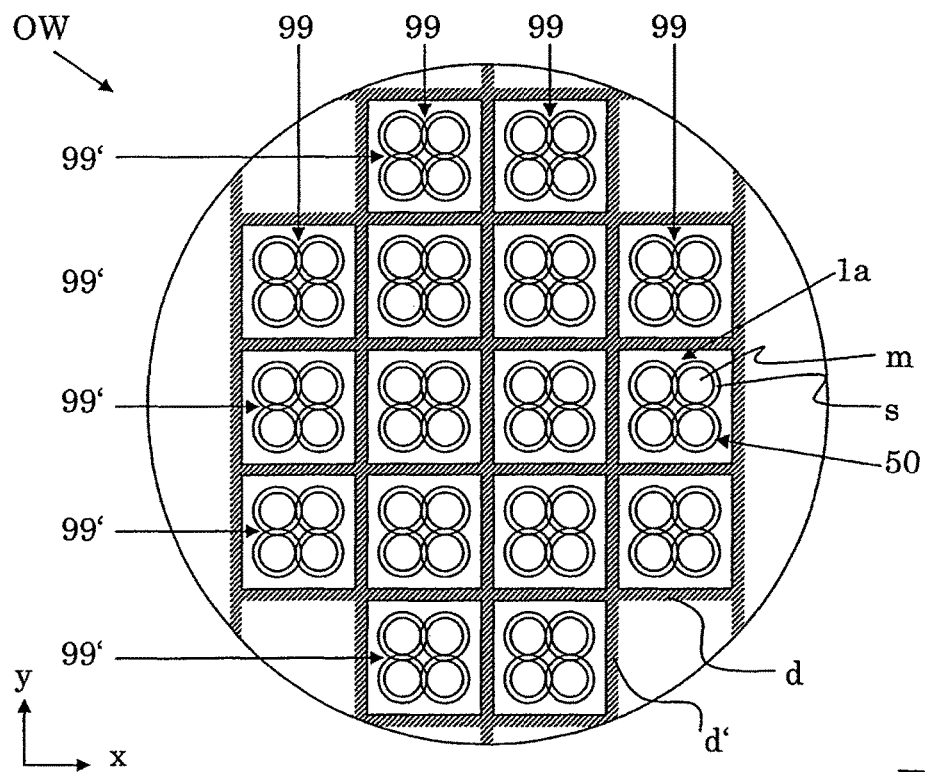
FIG. 21 an illustration of a wafer comprising a multitude of sets of optical structures, in a top view.

FIG. 21 is a very schematic illustration of a wafer, more particularly of an optics wafer OW like the one illustrated in FIG. 20, comprising a multitude of sets of optical structures 50, in a top view. In particular, optics wafer OW comprises a multitude of optical devices 1a comprising a set of four optical structures 50 each. And each of the four optical structures 50 comprises a main portion m and a surrounding portion s, the latter overlapping. Such devices maybe used, e.g., in four-channel sensors such in optical modules for array cameras. References 99 and 99' indicate lines along which dicing saw action as described in conjunction with FIG. 20 may be applied. Dicing may subsequently take place along dicing lines d and d', for obtaining separate optical devices 1a.

In the following, specific ways of manufacturing particular optical structures or sets of such, such as truncated passive optical components or a set comprising one or more of these, shall be explained as well as the corresponding instruments such as masters and tools usable in the manufacture and ways of manufacturing these.

Figure 22:
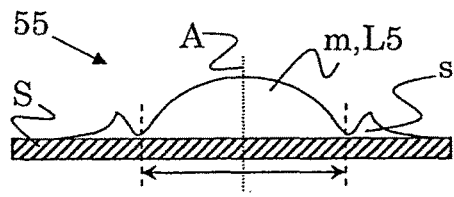
FIG. 22 an optical structure comprising a passive optical component, in a cross-sectional view.

FIG. 22 shows an optical structure 55 comprising a passive optical component L5, more particularly a spherical lens, in a cross-sectional view. Such a (not-truncated) passive optical component L5 having a circular aperture is obtainable using embossing with flow control (cf. explanations further above in the present patent application) using a tool as illustrated in FIG. 23 which will be referred to as precursor tool Tp for reasons which become clear below.

Figure 24:
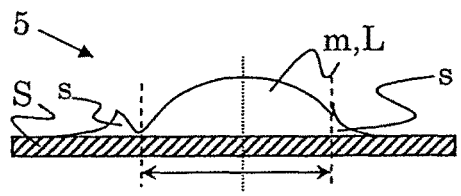
FIG. 24 an optical structure comprising a truncated passive optical component, in a cross-sectional view.

FIG. 24 shows an optical structure 5 comprising a passive optical component L, more particularly a truncated spherical lens, in a cross-sectional view. The lens aperture of lens L of FIG. 24 has a shape different from the one of lens L5 of FIG. 22, cf. also the double-sided arrows. Such a truncated passive optical component L having an aperture describing a circle from which a portion is removed, is obtainable using embossing with flow control (cf. explanations further above in the present patent application) using a tool as the one illustrated in FIG. 25. Note that the surrounding portion s of optical structure 5 has a varied (non-circular) shape (due to the tool T lacking rotational symmetry).

It is furthermore remarkable that the tool T is lacking (at least in the appropriate position) a surface portion describing at least one surface of the passive optical component to be produced, more particularly there is no surface portion comprised in tool T which would describe the surface (edge surface) of the truncated passive optical component where the truncated portion of the passive optical component is.

Figure 23:
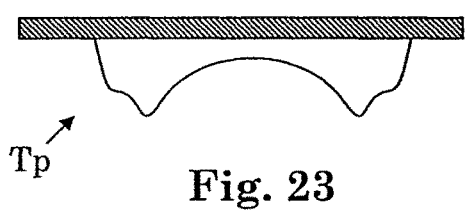
FIG. 23 a precursur tool, in a cross-sectional view.
Figure 25:
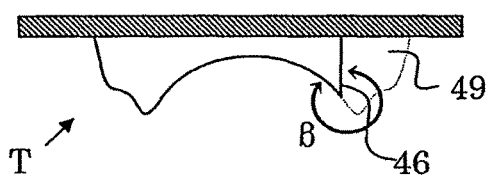
FIG. 25 a tool, in a cross-sectional view.

The tool T of FIG. 25 is obtainable from the precursor tool Tp of FIG. 23 by removing a portion 49 of material thereof, e.g., by laser cutting or sawing.

Precursor tool Tp, however, may be—where it forms its replication surface—rotationally symmetric and, e.g., manufactured using a corresponding master (cf. FIG. 1).

By removing material 49 from precursor tool Tp, a surface 46 referred to as flow-stop surface 46 is produced. As indicated in FIG. 25, an angle β between this flow-stop surface 46 and the adjacent replication surface portion of tool T is clearly larger than 180°, usually still clearly above 230°. This can be helpful when using tool T in replication with flow control.

Thus, for producing passive optical components with a truncated lens aperture, one can take a precursor tool Tp and to remove a portion of material 49 thereof and thus obtain a tool T for use in subsequent replication steps for manufacturing the desired passive optical components.

Figure 26:
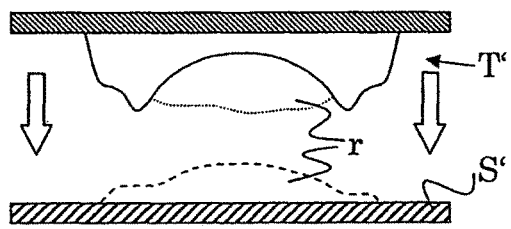
FIG. 26 an illustration of replication, in a cross-sectional view.

FIG. 26 is an illustration of replication, in a cross-sectional view, for illustrating that replication material may be applied to either the tool T' or the substrate S' or to both, tool and substrate. Tool T' can then be moved towards substrate S' or vice versa, or both move towards the respective other before hardening in the final position.

Figure 27:
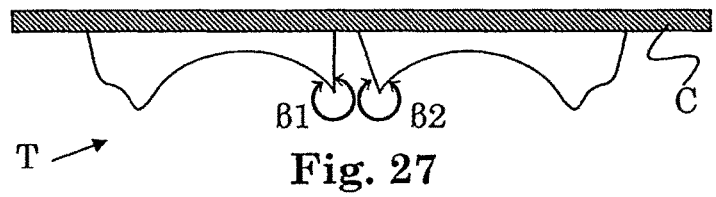
FIG. 27 a composed tool, in a cross-sectional view.

For manufacturing a set of, e.g., two such truncated passive optical components such as a pair of those illustrated in FIG. 24, two tools of FIG. 25 may be combined on a common holder C, as illustrated in FIG. 27, wherein the flow-stop surfaces may be inclined, in particular, as illustrated, by different angles β1, β2. Of course, all the "partial" tools combined on a common holder for manufacturing sets of passive optical components do not need to be identically shaped, e.g., in particular in case the passive optical components of the set are differently shaped.

Alternatively, for manufacturing a set of, e.g., two truncated passive optical components such as of a pair of those illustrated in FIG. 24, one can use a single tool twice for each set, provided that the passive optical components of the set shall be (nominally) identically shaped.

Figure 39:
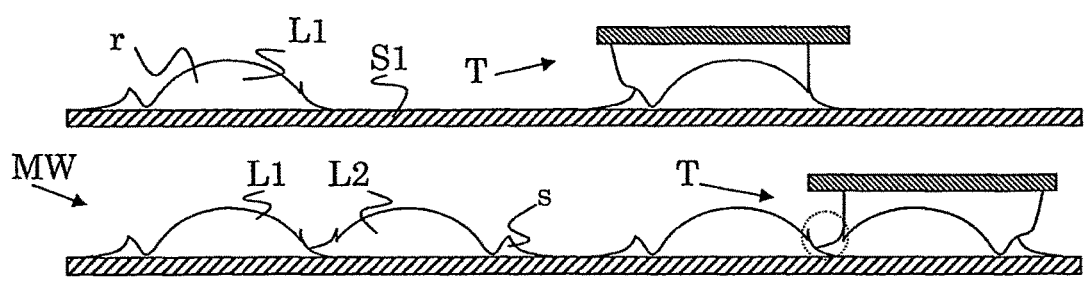
FIG. 39 an illustration of a way of manufacturing a master wafer, in a cross-sectional view.
Figure 28:
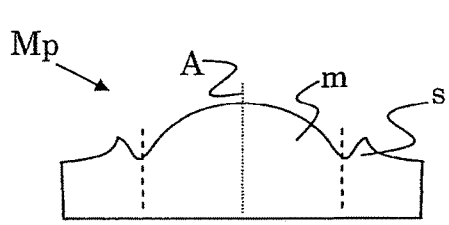
FIG. 28 an illustration of a precursor master, in a cross-sectional view.

FIG. 39 is an illustration of such a way of manufacturing a master wafer MW, in a cross-sectional view. The upper portion illustrates that tool T is used for forming first lenses L1 of each set from replication material r applied to substrate S1. The lower portion of FIG. 28 illustrates that subsequently, i.e. after all first lenses L1 are produced in a multitude of embossing and hardening steps, the same tool T may be used, but rotated by 180° about a vertical axis, for producing second lenses L2 of the sets. Note that this may be accomplished in such a way that the surrounding portions s of the lenses overlap, cf. the region indicated by the dotted circle in the lower portion of FIG. 28.

In this case of overlap and also in other cases where passive optical components are too close to each other or overlap, removal of material such as described above in conjunction with FIG. 13 or 20 may be applied.

A tool T for two or more passive optical components of a set may also be obtained from an integrally formed precursor tool, by removing material from such a precursor tool. A so-obtained tool may, e.g., look like the one of FIG. 27, wherein the "partial" tools, i.e. the portions having replication surfaces for different passive optical components of a set, will usually not be distinct parts, but still form a unitary part. This may contribute to an increased alignment precision, in particular concerning mutual position and orientation of the passive optical components. The removal of material from the precursor tool may be accomplished using, e.g., milling, laser ablation, micro-machining, cutting using a blade.

A precursor tool like that may be obtained using replication. Therein, a unitary master may be used allowing to obtain the precursor tool in one replication step. However, in particular if passive optical components with spherical surfaces shall be manufactured, it may be desirable to manufacture a master from one or more precursor masters having a spherical surface, which may be manufactured using, e.g., diamond turning. Cutting off a portion of one or of each of such precursor masters and fixing them to a common holder, e.g., in the way illustrated in FIG. 27 for manufacturing a tool, can then result in a suitable master for manufacturing the before-mentioned precursor tool for two or more passive optical components.

In the manufacture of truncated passive optical components or of sets of passive optical components, particular masters may be used, in particular such masters which are obtainable from a precursor master by adding material thereto. As mentioned in the before-addressed manufacturing method, it may be desirable to manufacture a master from one or more precursor masters having a spherical surface each, in particular if passive optical components with spherical surfaces shall be manufactured. Such precursor masters may be manufactured using, e.g., diamond turning. Cutting off a portion of one or of each of such precursor masters and adding, e.g., a bar at the cut-off edge, at the surface where the material has been removed, can allow to obtain a suitable master.

Note that a rotationally symmetric replication surface of a precursor master can thus be modified so as to produce a no more rotationally symmetric replication surface of the master.

Figure 29:
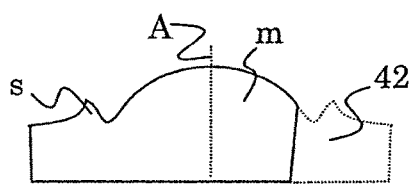
FIG. 29 an illustration of a precursor master with removed material, in a cross-sectional view.

FIG. 28 illustrates, in a cross-sectional view, a precursor master Mp. FIG. 29 illustrates the situation with material 42 removed from precursor master Mp. Then, material is added, for forming a protruding part 41 of master M. FIG. 29 shows an example for a master M comprising the cut-off precursor master with added material of protruding part 41. Protruding part 41 forms a surface 44 referred to as protrusion surface which forms an angle α with the adjacent portion of the replication surface. That angle α usually is smaller than 150° and rather smaller than 130°.

Figure 31:
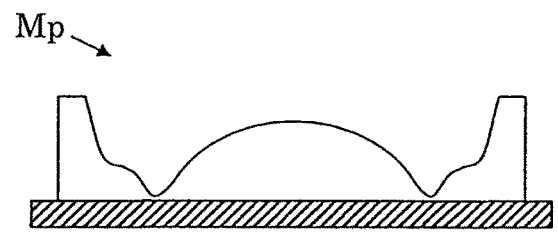
FIG. 31 an illustration of a precursor master, in a cross-sectional view.
Figure 32:
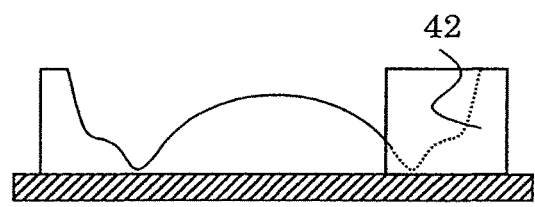
FIG. 32 an illustration of a precursor master with removed material, in a cross-sectional view.
Figure 30:
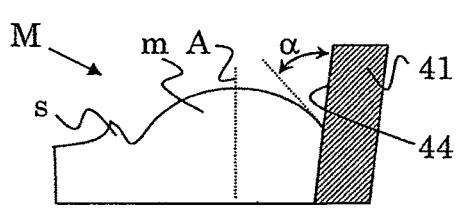
FIG. 30 an illustration of a master with a protruding part, in a cross-sectional view.
Figure 33:
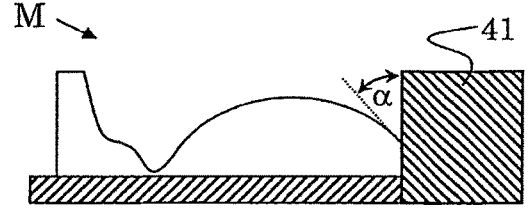
FIG. 33 an illustration of a master with a protruding part, in a cross-sectional view.

FIGS. 31 to 33 illustrate how another master M is obtained in a similar way as the one of FIG. 30.

The protruding portions 41 can allow to ensure the presence of an empty volume in a tool (or precursor tool) obtained using replication using the master. Such an empty volume may fulfill the same or at least similar functions as the space between the two partial tools in FIG. 27.

Note that a master like the one of FIG. 30 or the one of FIG. 33 may, e.g., be used for a first and for a subsequent second embossing step in the manufacture of a tool for a set of two passive optical components, in particular wherein the tool is rotated 180° in the second step, like described for tools in conjunction with FIG. 39. Such a multiple-times use of a master may also be accomplished with a master obtained in a different way, e.g., a master forming, at least where it forms its replication surface, a unitary or integrally formed part.

Of course, subsequently embossing using not only the same, but different masters makes possible to manufacture sets comprising different passive optical components.

Figure 34:
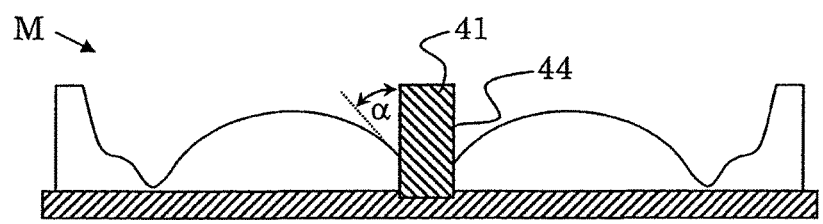
FIG. 34 an illustration of a master for two passive optical components, with a protruding part, in a cross-sectional view.
Figure 35:
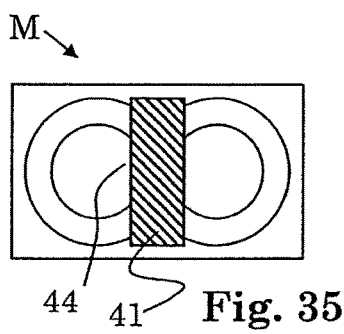
FIG. 35 a not-to-scale strongly schematized illustration of a top-view onto a master similar to the one of FIG. 34.

A master M for two (or generally also even more) passive optical components can be made from two (or more) precursor masters, e.g., such as those of FIGS. 28 and 31. An example for such a master M composed of two cut masters plus added material (protruding portion 41) is illustrated in FIG. 34. FIG. 35 sketches, only very schematically, not to scale, a top view onto a composed master M like the one of FIG. 34.

Figure 36:
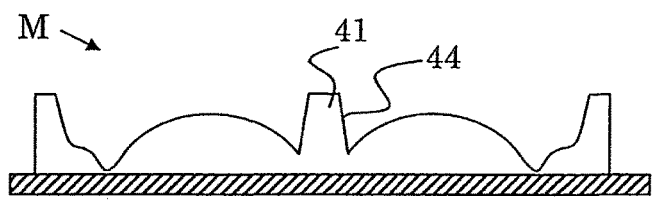
FIG. 36 an illustration of a master for two passive optical components, with a protruding part, in a cross-sectional view.

As illustrated in FIG. 36, it is also possible to manufacture a master M for two (or more passive optical components) as a unitary part (at least in the region where it forms its replication surface), e.g. using micro-machining. Of course, in a similar manner, a master for one passive optical component only can be manufactured as well.

The various optical structures and sets of optical structures and devices herein described may find various applications, e.g., in optical or opto-electric devices or modules, in particular in sensor and photographic applications, and especially in multi-channel devices such as array cameras or proximity sensors.

Figure 37:
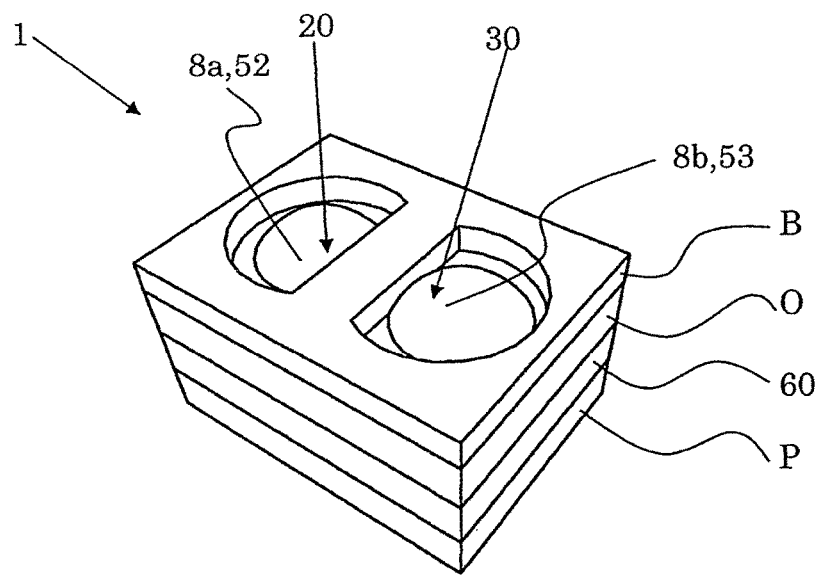
FIG. 37 a two-channel optical module, in a perspective view.

FIG. 37 illustrates a device 1 which is a two-channel optical module, in a perspective view. We shall assume this module is a proximity sensor or a module for a proximity sensor. But the principles apply, possibly with slight modifications, to many other kinds of modules and devices. Module 1 comprises an emission channel 20 from which light, e.g., infrared light can be emitted, and a detecting channel in which light, e.g., infrared light can be detected. Composed lenses 8a and 8b are present in channels 20 and 30, respectively, of which passive optical components or lens elements 52 and 53, respectively, are visible. They are comprised in an optics member O. On the upper side of optics member O, a baffle member B is arranged, and on the opposite side, a substrate P such as a printed circuit boards is present, which is spaced from optics member O by a spacer member 60.

The module can be fully manufactured on wafer level, dicing being applied to a wafer stack comprising
- a substrate wafer comprising a multitude of substrate members P;
- a spacer wafer comprising a multitude of spacer members 60;
- an optics wafer comprising a multitude of optics members O; and
- a baffle wafer comprising a multitude of baffle members B.

Figure 38:
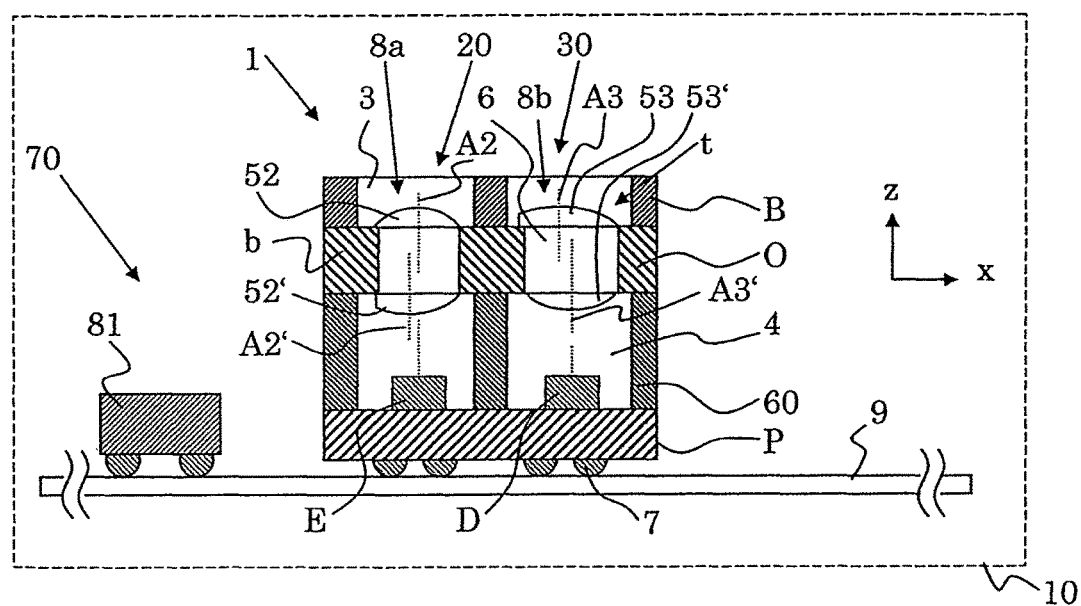
FIG. 38 a device comprising a two-channel optical module of FIG. 37, partially in a cross-sectional view.

FIG. 38 illustrates a device 10 comprising a two-channel optical module 1 of FIG. 37. Device 10 can be, e.g., a photographic device such as an array camera or a sensor device or a communication device such as a smart phone, or a hand-held electronic device.

In principle, it can be referred to the incorporated U.S. provisional patent application with Ser. No. 61/577,965 for details concerning manufacture and constitution of such devices 10 and modules 1. Nevertheless, some points shall be mentioned here explicitly.

Device 10 comprises a printed circuit board 9 on which module 1 and further in particular electronic components such as an integrated circuit 81 functioning, e.g., as a control unit for module 1 are mounted. Module 1 is electrically interconnected with printed circuit board 9, e.g., via solder balls 7, thus providing also an electrical connection to component 81. Accordingly, an electronic circuit 70 is formed.

On substrate P, a light emitter E such as an LED and a light detector D such as a photo diode are present. In case, e.g., of an array camera, each channel might comprise an image sensor (multi-pixel sensor). Composed lens 8a comprises two passive optical components or lens elements 52, 52' which are attached to opposite faces of a transparent portion t present in optics member O in form of a transparent element 6 such as a block of a transparent polymer. Composed lens 8b comprises two passive optical components or lens elements 53, 53' which are attached to opposite faces of another transparent portion t present in optics member O.

In FIG. 38, hatched portions of the members P, 60, O, B are not transparent, not-hatched ones are transparent. In case of openings 4 in spacer member 60 and of transparent regions 3 of baffle member B, no solid material is present, but usually merely air or another gas or vacuum.

Lens element 52' is a truncated passive optical component, and its optical axis A2' is shifted with respect to the optical axis A2 of lens element 52.

Lens element 53 is a truncated passive optical component, and its optical axis A3 is shifted with respect to the optical axis A3' of lens element 53'.

Various possible ways of manufacturing such a module 1 and in particular the composed passive optical components 8a, 8b are readily inferred from the methods described above.

What is claimed is:

1. A method for manufacturing a device comprising a set of at least two passive optical components, said method comprising:
   manufacturing the at least said two passive optical components using embossing with flow control using a tool obtained by carrying out tool manufacturing steps, said tool manufacturing steps comprising:
   i) manufacturing a precursor tool having a rotationally symmetric replication surface; and
   ii) modifying said replication surface by removing material from said precursor tool such that the obtained replication surface is not rotationally symmetric, and such that an aperture of at least one of said passive optical components is reduced relative to a passive optical component that would be produced using the precursor tool in the absence of said step of modifying.

2. The method according to claim 1, wherein at least one of said passive optical components of said set is a truncated lens.

3. The method according to claim 1, wherein said replication surface of said precursor tool is suitably shaped for manufacturing by replication a precursor passive optical component, wherein from said precursor passive optical component, a passive optical component of said set of passive optical components is obtainable by truncating said precursor passive optical component.

4. The method according to claim 1, comprising carrying out said tool manufacturing steps.

5. The method according to claim 1, wherein said device comprises a set of optical structures each of which comprises a main portion and a surrounding portion at least partially surrounding the respective main portion, wherein each of said main portions is identical with one of said passive optical components of said set of passive optical components, wherein each of the surrounding portions is distinct from each of the main portions.

6. The method according to claim 5, wherein each of said optical structures forms a unitary part.

7. The method according to claim 5, wherein surrounding portions of at least two of said optical structures are overlapping or partially coinciding.

8. The method according to claim 1, wherein manufacturing the at least two passive optical components comprises carrying out, in the presented order, the following:
   r0) providing a substrate;
   r11) moving said substrate and said tool towards each other with a first portion of a replication material between them;
   r12) hardening said first portion of replication material;
   r13) moving said substrate and said tool away from each other, said hardened first portion of replication material remaining in a first location of said substrate;
   r21) moving said substrate and said tool towards each other with a second portion of a replication material between them;
   r22) hardening said second portion of replication material;
   r23) moving said substrate and said tool away from each other, said hardened second portion of replication material remaining in a second location of said substrate, wherein said first location is different from said second location.

9. The method according to claim 8, wherein said hardened first and second portions of replication material are adjacent to each other.

10. The method according to claim 9, wherein said hardened first and second portions of replication material are in direct physical contact with each other.

11. The method according to claim 8, wherein said hardened first portion of replication material comprises a first one of said set of passive optical components and said hardened second portion of replication material comprises a second one of said set of passive optical components.

12. The method according to claim 8, wherein r11) to r23) are carried out a plurality of times, each time in a different region of said substrate.

13. The method according to claim 12, wherein r11) to r13) are carried out in said plurality of different regions of said substrate and subsequently thereto, r21) to r23) are carried out in said plurality of different regions of said substrate.

14. The method according to claim 12, wherein the sequence of r11) to r23) is carried out subsequently in said plurality of different regions of said substrate.

15. The method according to claim 1, wherein said tool manufacturing steps comprise:
   i1) manufacturing a first precursor tool having a first replication surface;
   i2) manufacturing a second precursor tool having a second replication surface;
   ii1) modifying said first replication surface by removing material from said first precursor tool;
   ii2) modifying said second replication surface by removing material from said second precursor tool.

16. The method according to claim 15, wherein said tool comprises the so-obtained modified first and second precursor tools.

17. The method according to claim 16, wherein said tool comprises the so-obtained modified first and second precursor tools fixed with respect to each other.

18. The method according to claim 1, wherein said tool manufacturing steps comprise:
   providing one or more masters;
   manufacturing, using replication, said precursor tool using said one or more masters.

19. The method according to claim 18, wherein at least one of:
   said precursor tool is, at least where it forms its replication surface, made of a replication material;
   said precursor tool forms, at least where it forms its replication surface, a contiguous part;
   the replication surface of the precursor tool has a shape describing the negative of at least a portion of a first and of at least a portion of a second passive optical component of said passive optical components of said set.

20. The method according to claim 18, wherein at least one of said one or more masters is of rotational symmetry, at least in the region where it forms its replication surface.

21. The method according to claim 1, wherein said device is at least one of:
   a passive optical component;
   a lens;
   an optical module;
   a multi-channel optical module;
   an opto-electronic module;
   a multi-channel opto-electronic module;
   an optical device;
   a multi-channel optical device;
   a wafer;
   a wafer stack;
   a photographic device;
   a communication device;
   a smart phone;
   a sensor;
   a proximity sensor;
   an ambient light sensor.

22. The method according to claim 1, wherein manufacturing the at least two passive optical components comprises:
   manufacturing a master wafer, by replication, using said tool;
   manufacturing a replication tool, by replication, using said master wafer; and
   manufacturing, by replication using said replication tool, a multitude of sets of at least two passive optical components each, said multitude of sets comprising the before-mentioned set of at least two passive optical components.

23. The method according to claim 1, wherein a first passive optical component and a second passive optical component of the set are distant from one another.

24. The method according to claim 1, wherein the passive optical components of the set are all distant from one another.

* * * * *

UNITED STATES PATENT AND TRADEMARK OFFICE
CERTIFICATE OF CORRECTION

| | |
|---|---|
| PATENT NO. | : 10,377,094 B2 |
| APPLICATION NO. | : 14/426472 |
| DATED | : August 13, 2019 |
| INVENTOR(S) | : Hartmut Rudmann et al. |

Page 1 of 1

It is certified that error appears in the above-identified patent and that said Letters Patent is hereby corrected as shown below:

On the Title Page

Item (72) Inventors:
Please correct the spelling of the fourth inventor's last name from "Bietesch" to -- Bietsch --

Signed and Sealed this
Twenty-fourth Day of March, 2020

Andrei Iancu
*Director of the United States Patent and Trademark Office*